US007401331B2

(12) United States Patent
Leung

(10) Patent No.: US 7,401,331 B2
(45) Date of Patent: Jul. 15, 2008

(54) METHOD TO ADD NEW SOFTWARE FEATURES WITHOUT MODIFYING EXISTING CODE

(76) Inventor: Wu-Hon Francis Leung, 1916 Elmore Ave., Downers Grove, IL (US) 60515

( * ) Notice: Subject to any disclaimer, the term of this patent is extended or adjusted under 35 U.S.C. 154(b) by 759 days.

(21) Appl. No.: 10/487,102

(22) PCT Filed: Aug. 9, 2002

(86) PCT No.: PCT/US02/25463

§ 371 (c)(1),
(2), (4) Date: Feb. 17, 2004

(87) PCT Pub. No.: WO03/017098

PCT Pub. Date: Feb. 27, 2003

(65) Prior Publication Data

US 2004/0243971 A1 Dec. 2, 2004

Related U.S. Application Data

(60) Provisional application No. 60/313,364, filed on Aug. 17, 2001.

(51) Int. Cl.
*G06F 9/44* (2006.01)
*G06F 9/45* (2006.01)
(52) U.S. Cl. .................. 717/168; 717/170; 717/174
(58) Field of Classification Search ......... 717/104–105, 717/120–121, 168–174
See application file for complete search history.

(56) References Cited

U.S. PATENT DOCUMENTS 5,418,964 A * 5/1995 Conner et al. ............... 719/316
5,692,195 A * 11/1997 Conner et al. ............... 719/316
5,764,226 A    6/1998 Consolatti et al.
5,815,149 A    9/1998 Mutschler, III et al.
6,135,651 A * 10/2000 Leinfelder et al. .......... 717/168
6,167,564 A    12/2000 Fontana et al.
6,370,681 B1 * 4/2002 Dellarocas et al. .......... 717/110
6,434,744 B1 * 8/2002 Chamberlain et al. ....... 717/168
6,662,357 B1 * 12/2003 Bowman-Amuah ......... 717/120

(Continued)

OTHER PUBLICATIONS

Leich et al, "Tool support for feature oriented software development", ACM eclispe, pp. 55-59, 2005.*

(Continued)

*Primary Examiner*—Anil Khatri
(74) *Attorney, Agent, or Firm*—Brinks Hofer Gilson & Lione

(57) ABSTRACT

A computer-aided method (FIG. 12) for developing software by which programmers may implement different features of an application as independent reusable components, even though these features affect the control flows of one another. A programmer may add new features to an application without the labor intensive tasks of examining and modifying existing code. The programmer uses a set of programming language constructs to specify nonprocedural program units, organize the program units into reusable features and integrate several features together into a feature package. An interaction detection algorithm analyzes program units and determines whether there is interaction among program units in a feature and among features in a feature package. The programmer must resolve the interaction, if detected, before the programs can be executed. A run time system specification supports the semantics of the programming language constructs and preserves the conditions that enable interaction detection.

53 Claims, 25 Drawing Sheets

U.S. PATENT DOCUMENTS

| | | | | |
|---|---|---|---|---|
| 6,708,332 | B2* | 3/2004 | Murphy et al. | 717/168 |
| 6,769,114 | B2* | 7/2004 | Leung | 717/124 |
| 6,862,615 | B1* | 3/2005 | Ehrlich et al. | 709/221 |
| 6,918,107 | B2* | 7/2005 | Lucas et al. | 717/124 |
| 6,931,621 | B2* | 8/2005 | Green et al. | 717/100 |
| 6,990,654 | B2* | 1/2006 | Carroll, Jr. | 717/109 |
| 7,017,146 | B2* | 3/2006 | Dellarocas et al. | 717/106 |
| 7,076,766 | B2* | 7/2006 | Wirts et al. | 717/121 |
| 7,096,454 | B2* | 8/2006 | Damm et al. | 717/105 |
| 7,139,999 | B2* | 11/2006 | Bowman-Amuah | 717/101 |
| 7,149,734 | B2* | 12/2006 | Carlson et al. | 707/6 |
| 7,152,228 | B2* | 12/2006 | Goodwin et al. | 717/146 |
| 7,191,435 | B2* | 3/2007 | Lau et al. | 717/168 |
| 7,246,351 | B2* | 7/2007 | Bloch et al. | 717/175 |

OTHER PUBLICATIONS

Gannod et al, "An automated approach for supporting software reuse via reverse engineering", IEEE ASE, pp. 94-103, 1998.*

Uyama, "A blackboard based architecture for filtering new software features", ACM COOCS, pp. 210-215, 1993.*

Juan et al, Customizing AOSE methodologies by reusing AOSE features:, ACM AAMAS, pp. 113-120, 2003.*

Zaremski, A. M. et al., "Specification Matching of Software Components," ACM Transactions On Software Engineering and Methodology. Association for Computing Machinery, New York, US., vol. 6, No. 4, Oct. 1997, pp. 333-369.

Apel, U., "On-Line Software Extension and Modification," Electrical Communication, Alcatel, Brussels, Belgium, vol. 64, No. 4, Jan. 1990, pp. 327-333.

Okamoto, A. et al., "Dynamic Program Modification in the Non-stop Software Extensible System (NOSES)," IEEE, 1994, pp. 1779-1783.

Wu et al., "Techniques of Maintaining Evolving Components-Based Software", IEEE, Oct. 2000, pp. 236-246.

Sugumaran et al., "Identifying Software Components from Processing Requirements Using Domain Model and Object Libraries", Proceeding of the 20th International Conference on Information System, Jan. 1999, pp. 65-81.

Krueger, "Software Reuse", ACM Computing Surveys, vol. 24, No. 2, Jun. 1992, pp. 131-183.

* cited by examiner

```
Domain class Integer {
            int X;

public:
            int operator + (X, X);
            int operator - (X, X);
            int operator * (X, X);
            int operator / (X, X);

predicate functions:
            BOOL operator == (X, X);
            BOOL operator != (X, X);
            BOOL operator > (X, X);
            BOOL operator >= (X, X);
            BOOL operator < (X, X);
            BOOL operator <= (X, X);

combination (list_of (predicate_operator_on (X,X)));
}
```

Fig. 2

```
Event Termination_request {
            qualifying Integer calling_party;
            string comments;
}
```

Fig. 3

Model telephone {

Domain variables:
    enum STATES ( IDLE, DIALING, OUTPULSING, BUSY,
        AUDIBLE, TALKING, DISCONNECT,
        RINGING);
    STATES state;
    Initially {
    sate = IDLE; };

Event Interfaces:
    TERMINATION-REQ Termination_request;
    DISCONNECT Disconnect;
    ANSWER Answer;
    RINGING Ringing;
    BUSY Busy;
    SIGNAL Onhook, Offhook, Flash;
    DIGITS Digits;
    TIME-OUT Time_out;
    INPUT Input;

Fig. 4

```
Condition: (state == IDLE); {

Unit Origination {
            event: Offhook; ( provide-dial-tone();
                    state = DIALING;

}
};

Unit Termination (
            event: Termination-request; { send (Termination-request. Calling-party; Answer);
                    state = RINGING;

```
Event: Onhook; {

Unit Talk-to-idle {
            condition: (state == TALKING) { release-connection();
                        state = IDLE;

}
};

Unit Abandon {
            condition: (state == DIALING) OR
                        (state == OUTPULSING)) { release-digit-receiver ();
                        state = IDLE;

The above three program units can be written as:

Unit Combined {
        condition: (C1 AND E1) OR (C2 AND E2) OR (C3 AND E3); {

B1;
        }
}

```
Unit Abandon { condition: (state == DIALING);
        event: Onhook; { release-digit-receiver ();
        state = IDLE;
        }
}
```

Fig. 6

If U1, U2 and U3 are related by:

Straight-precedence (U1, U2, U3)

Then the short hand of its equivalent program units is:

Unit straight-U1-U2-U3 { condition: (C1 AND E1) OR (C2 AND E2) OR (C3 AND E3); { if (C1 AND E1) {
        B1; exit;
    } else {
    if (C2 AND E2) {
        B2; exit;
    } else {
        B3;
    }

}

If U1, U2 and U3 are related by:

Priority-precedence (U1, U2, U3);

Then the short hand of its equivalent program units is:

Unit priority-U1-U2-U3 {
    condition: (C1 AND E1) OR (C2 AND E2) OR (C3 AND E3); { if (C1 AND E1) B1;
        if (C2 AND E2) B2;
        if (C3 AND E3) B3;

}
}

```
Feature Call-Forwarding {
            model: telephone;
            anchor: POTS;
            PHONE-NUMBER forward-to-number; { priority-precedence (Call-Forwarding, POTS);

Unit activate {
            condition: (state == DIALING);
       '    event: Digits (first-digit == #); { forward-to-number = (Digits - first-digit);
            announce (""Your calls will be forwarded to", forward-to-number");
            }
}

Unit deactivate {
            condition: (state == DIALING);
            event: Digits (first-digit == *); { forward-to-number = empty;
            announce ("Your calls will no longer be forwarded");
            }
}

Unit forward-call {
            condition: any(state);
            event: Termination-request (calling-party != forward-to number) { if (forward-to-number != empty) {
                        send (forward-to-number, Termination-request);
                        stop;
            } else {
                        continue;
            }
      }
}
```

Fig. 8

```
Feature Package privileged-call-forward {
        model: telephone;
        features: POTS, Call-Forwarding, Do-Not-Disturb;
        PHONE-LIST privileged; { priority-precedence (privileged-call-forward,
                        Do-Not-Disturb, Call-Forwarding, POTS);

unit add-to-privileged {
                condition: any(state);
                event: Input (command == "add-to-privileged"); { privileged.add (Input.content);

}
        }
        unit delete-from-privileged {
                condition: any(state);
                event: Input (command == "delete-from-privileged"); { privileged.remove (Input.content);

}
        }
        unit interaction-resolution {
                condition: any(state);
                event: Termination-request; { if (privileged.contains (Termination-request.calling-party)) {
                                Call-Forwarding;
                        } else {
                                Do-not-disturb;
                                Stop;
                        }
                }
        }
}
```

Fig. 9

```
Model voicedata-phone extends telephone {
    Domain variables:
                    STATES = {{STATES}, ANNOUNCEMENT,
                              POST-ANNOUNCEMENT};
                    STATES state;
                    enum DATA-STATES { IDLE, CONNECTING,
                              CONNECTED, DISCONNECTING);
                    DATA-STATE data-state;
                    Initially {
                              state = IDLE;
                              data-state = IDLE };
    Interface events:
                    INPUT-COMMAND = {{INPUT-COMMAND},
                              "Update PIN"};
                    ORIGINATION-REQUEST {
                              SERVICE-CLASS service };
                    INPUT { INPUT-COMMAND command};
                    SND-DATAGRAM send-data;
                    RCV-DATAGRAM receive-data;
                    MK-CONNECT connect-to;
                    MK-DISCONNECT disconnect-from;
}
```

Fig. 10

```
Anchor feature securePOTS {
        model: voicedata-phone;
        features: telephone.POTS,
        CONNECTION connection;
        STRING Pin; {
        priority-precedence (securePOTS, telephone.POTS);

integer Pincount = 0;
        unit enter-PIN {
                condition: any (state);
                event: Input (command == "Update PIN"); { if (Pincount == 0) {
                output ("Repeat PIN");
                Pin = Input.content;
                Pincount = 1;
                } else {
                        if (Pin == Input.content) {
                        output ("PIN updated'); Pincount = 0;
                        } else {
                        output ("PINs don't match; start over");
                        Pincount = 0; }
                } unit ask-for-PIN {
                condition: (state == IDLE);
                event: Termination-request; { connection.setup (Termination-request.calling-party);
                connection.announce ( "Please enter security id");
                connection.timeout (15sec);
                connection.collect-digits ();
                state = POST-ANNOUNCEMENT;
                }
}
```

Fig. 11a

```
condition: (state == POST-ANNOUNCEMENT);

unit check-id {
            event: Digits; { if (Digits.content == Pin) {
                        state = RINGING;
            } else {
                        connection.announce(PIN does not match);
                        state = IDLE;}
            connection.cancel-timeout();
            connection.disconnect ();
            } unit time-out {
            event: Time-out; { connection.announce(Bye-bye);
            connection.disconnect ();
            state = IDLE;}
            }
   }
}
```

Fig. 11b

```
Unit global cover {
        condition: any(state);
        event: any; {
                        /* undefined state space encountered */
                        print ("value of state; event, event queue
                        content, previous program unit name");
                        ring ("bell very loud");
                        exit;
                        }
        }
```

Fig. 21

METHOD TO ADD NEW SOFTWARE FEATURES WITHOUT MODIFYING EXISTING CODE

This application is the National Stage of International Application No. PCT/US02/25463 filed on Aug. 9, 2002, which claims the benefit of priority under 35 U.S.C. §119(e) of U.S. Provisional Patent Application No. 60/313,364 filed on Aug. 17, 2001, both of which are hereby incorporated by reference in their entirety.

TECHNICAL FIELD

This invention relates to the field of computer programming languages, the method of using such a programming language, and the procedure to execute and analyze programs written in such a programming language.

BACKGROUND

This application is a non-provisional application claiming priority under 35 U.S.C. §120 to provisional application Ser. No. 60/313,364, filed Aug. 17, 2001 of the same name and to the same inventor as the instant application.

In software development, the need often arises to add new features to an application already implemented with existing code. This is one of the most difficult tasks in software development, especially if the new features will change the execution flow of the original program. For example, in a telephone switching system, to add programs to implement the "call forwarding" feature will change the execution flow of the existing "plain old telephone service" and other features. To add such new features using existing general purpose programming languages, the programmer must modify existing code. That requires the programmer to be thoroughly familiar with the existing code and be able to trace, line by line, the different execution flows of existing code to determine where to make the changes. With existing art, this is a labor-intensive process as there is no automated tool that can help the programmer. At the end, the programmer is often left wondering whether she has correctly determined the code to be changed, whether she has found all of them and what impact her changes may have on existing functionality. It will require exhaustive testing and many trials and errors before the job is considered done.

In addition, in large-scale software development, it is often necessary to assign different programmers to develop different features of an application. Using today's general purpose programming languages such as C++ or Java, the programs of "call waiting" will require changes in the programs of "three way calling" and vice versa as these features affect each others' control flow. The programmers need to negotiate with each other thus complicating their design task. Their designs become intertwined and the resultant software obscures the logic of the individual features making them difficult to maintain. Each feature cannot be a standalone library component. They will all be loaded as a monolithic object whether the user desires all of them. Therefore, there is a need to enable programmers to design their features independently and package them as a library of components.

Later, we shall refer to programs that, when they are put together into a single executing program, one may change the execution flows of the other to be interacting programs. Alternatively, we may say one program interacts with another, or they interact with each other. Since feature programs are the programs that implement a feature, when we say two features or two feature programs interact with each other, we mean some programs of one feature interact with some programs of the other.

Using an existing general-purpose computer programming language, such as C++ or Java, a programmer must sequence the execution flows of program statements. This makes it necessary to change code when interacting feature programs must be integrated together. Furthermore, programs written in existing general-purpose languages are not easy to analyze. Presently, a tool does not exist that can help the programmer to identify where to add new feature programs into existing code.

BRIEF SUMMARY

We solve these problems by adding several nonprocedural language constructs and specifying the way programs written in this language will be executed and analyzed. The language allows the programmers to write interacting feature programs as independent library components. When the feature programs are packaged together, a tool can automatically identify the conditions where they interact with each other. The programmer can then use facilities provided by the language to resolve the interactions without changing existing code.

One nonprocedural language construct is program unit that consists of a condition part and a program body part. The program body part is executed when the corresponding condition part becomes true. Unlike using a conventional procedural language like C++ or Java, a programmer does not specify the execution order of program units in a nonprocedural language.

There are some prior art in computer operating systems that partially meets similar goals of this invention but for special cases. The streams facility in the UNIX operating system allows the programmers to implement computer communication protocols in different layers of a protocol stack as different streams modules. If an application calls for it, a programmer can insert or remove protocol modules from a stream without changing other modules in the same stream. The streams facility takes advantage of commonly accepted protocol architecture, such as the fact that protocols in different layers look at different header fields in a message, and enforces a uniform interface among the protocol modules. However, it is not a general solution to other applications. Another UNIX facility called pipe allows programmers to connect several programs together to create new functionality without changing any of the programs. But these programs must adhere to an input/output format of character strings and they must be arranged in a linear ordering such that the output of one program becomes the input to the other.

There exist a number of nonprocedural languages designed mainly for Artificial Intelligence applications such as for capturing expert knowledge and even for theorem proving. Because of the differences in purpose, the structure and facilities provided by these languages are very different from ours as well as the method of using the languages. For example, none of them requires explicit feature interaction (also called conflict) detection and resolution processes before a program written in them is ready for execution. Some of them, such as CLIPS, have mechanisms for programmers to specify the priority of execution when the conditions of two or more program units become true at the same time during execution. But the programmers typically do not know before hand what other programs may interact with their programs.

Previously, we developed a nonprocedural language specifically for telecommunication services (U.S. Pat. Nos. 4,695,977, 4,797,575, and 4,747,127 granted Sep. 22, 1987, Feb. 23, 1988, and May 24, 1988, respectively, to T. L. Hansen et. al. and entitled "Control of Real-Time Systems Utilizing a Nonprocedural Language," "State Control for a Real-Time System Utilizing a Nonprocedural Language," "Customer Programmable Real-Time System," respectively, all of which are herein incorporated by reference). However, the structure and facilities provided by that language are very different from the present method as the prior work was neither sufficiently rigorous to allow automatic detection of feature interaction nor did it provide facilities for the programmer to resolve feature interaction without changing existing code.

BRIEF DESCRIPTION OF THE DRAWINGS

FIG. 2 shows an example domain data type.

FIG. 3 shows an example event type.

FIG. 4 shows an example model statement for telephony call processing applications.

FIG. 5a shows a common condition statement for a set of program units. FIG. 5b shows a common event statement.

FIG. 6 shows an example program unit.

FIG. 7a shows an example of converting a straight-precedence list into program units.

FIG. 8 shows an example feature.

FIG. 9 shows an example feature package.

FIG. 10 shows an example model extension.

FIGS. 11a and b show a feature extension.

FIG. 21 shows an example program unit to handle the exception that the execution runs into a condition uncovered by other program units in a feature.

DETAILED DESCRIPTION OF PREFERRED EMBODIMENTS

Figure 1:
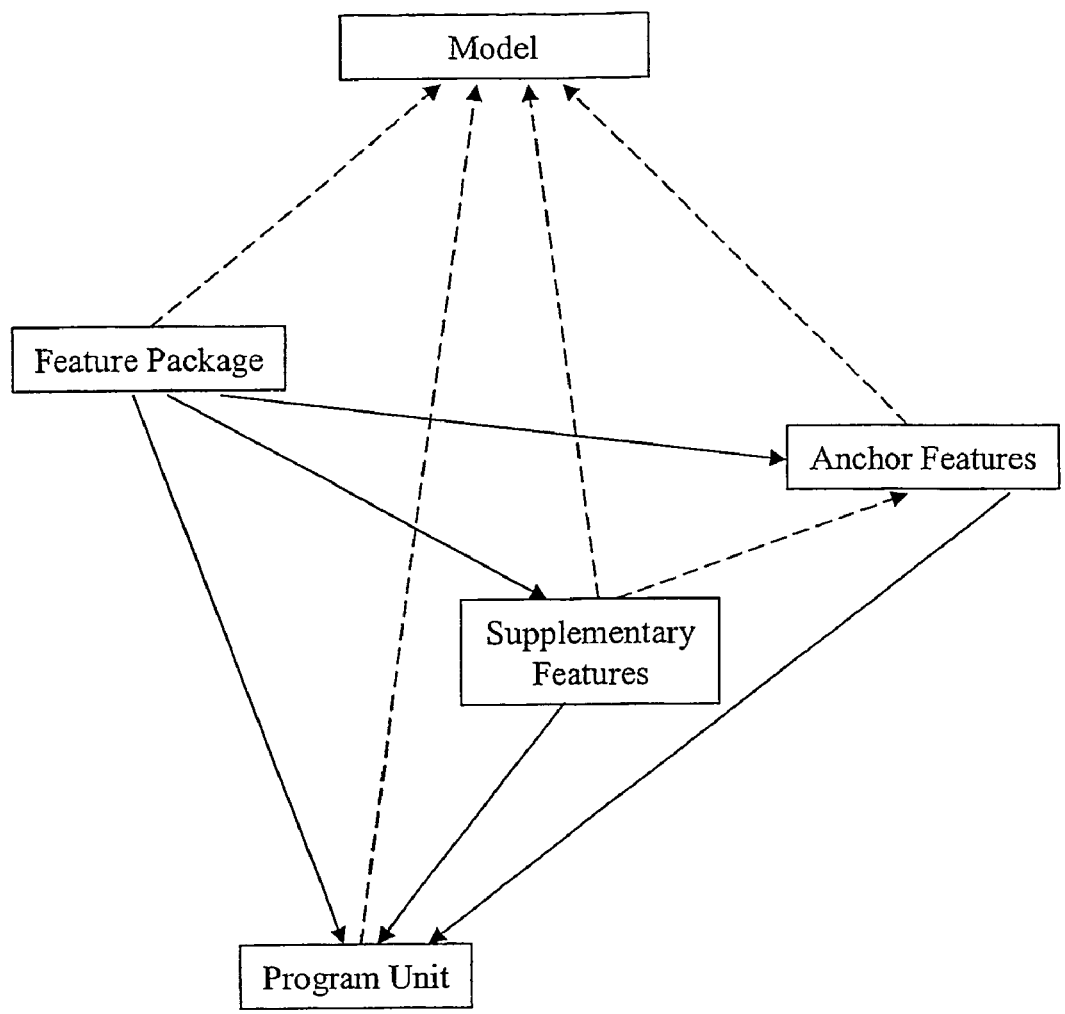
FIG. 1 shows the relationship among model, program units, anchor features, features and feature packages.

With existing art, when a programmer needs to add new functionality that changes the control flow of existing code, the programmer faces two possibilities. If the implementation language is procedural such as C, C++ or Java, the programmer will have to undergo a labor-intensive process of changing the existing code. If the implementation language is nonprocedural such as CLIPS, the programmer has very little control on how the new functionality should interact with the existing code.

In the present software development method the programmer develops the new functionality as a feature. The programmer goes through a computer-aided process to develop and integrate her feature with other features. The programmer puts together the set of features to a tool that will automatically identify the conditions by which these features interact with each other. The programmer then specifies how these interaction conditions should be resolved in a feature package. The original features are not modified and as a result they can be treated as reusable library components.

Thus, the present method permits the addition of new functionality to existing code, is an automated means or tool that identifies how the programmer should merge the new functionality with the existing code to enable the reuse of components with dynamic execution flow, and makes the programmer's job easier.

The above software development method is supported with four constituent parts: (1) a software development process; (2) a set of nonprocedural programming language constructs; (3) an algorithm to identify interaction conditions among feature programs; and (4) a run time system to execute feature programs written in the programming language.

We will first talk about the language constructs and the software components resulting from the use of the language constructs. We then describe the software development process followed by the interaction detection algorithm and the run time system.

Essential Software Components and Language Constructs

An executable application implemented in our programming language is a well-formed feature package. The feature package consists of a set of features, program units and possibly other feature packages. Each feature is in turn composed of a set of program units and possibly other features.

A program unit is a unit of execution. It consists of a condition part and a body part. The body part of a program unit is executed when the condition part becomes true. The body part will carry out some operations and may call programs written in other languages. The specification in the condition part refers to variables defined in a model.

The model is a representation of the application. It defines a set of domain variables and interface events used by programs of the model to implement the various features of the application. A state variable, such as an enumeration of the IDLE, TALKING and other states of a telephony application, is an example of a domain variable. A message, such as "Termination-request" used in terminating a telephone call, is an example of an interface event.

Features and the feature package are organizing concepts. A feature contains a set of program units and a feature package contains a set of features. One thinks of a feature as functionality, such as "call waiting" or POTS. A feature package is an application with a collection of functionality. Whereas a program unit is a unit of execution, a feature is a unit of reuse. A programmer can combine different sets of features to compose different feature packages. The programmer can even create different feature packages using the same set of features by resolving the interaction among the features differently.

We require that the condition parts of all program units in a feature be expressed in terms of the variables defined in the same model. Hence we say that a feature refers to a specific model. We further require that all features in the same feature package refer to the same model. In other words, all the programs within a feature package refer to the same model. The relationship among these software concepts is illustrated in FIG. 1. This section describes each of these software concepts. We start with the notion of a model.

Model

A model statement is identified with the keyword Model and a name. It contains the definition of domain variables (their initial values) and event interfaces. They are used to define the condition portion of a program unit.

Domain Variables

A domain variable is either of the type BOOLEAN, which specifies that the variable can have either the value TRUE or the value FALSE or it is a variable of a domain data type.

Domain Data Type

A domain data type is similar to a class in C++ or Java. In addition to defining a set of data and the operations on the data just as in a class, a domain data type defines a set of predicate functions and a combination function.

A predicate function operates on one or more variables of the domain type and returns a BOOLEAN value. For example, the domain data type of an integer will contain predicate functions that will determine whether an integer variable is positive, whether two integer variables are equal, whether one integer variable is greater than the other, and so on. We use the following terminology: a predicate function with specific domain variables is a predicate; a predicate or a domain variable of type BOOLEAN is an atom; an atom or its negation is a literal.

Given the conjunction of a set of literals of a domain data type, its combination function returns whether the conjunction is satisfiable. A BOOLEAN formula is satisfiable if there exists an assignment of truth-values to its literals such that the formula is true. In an implementation, the combination function may take a list of literals as input. We note that the integer domain data type given as an example in FIG. 2 is almost the same as the integer class given in Page: 8 "The C++ Programming Language," $3^{rd}$ Edition, B. Stroustrup, Addison-Wesley, 1997 except with the addition of a combination function.

Independence Requirement of Domain Variables

We require that domain variables are independent of each other. That is, the value of a domain variable cannot be a function of other domain variables. In other words, if a domain variable is in the left-hand-side of an assignment statement, there can be no other domain variable, or a derivative of another domain variable, in the right hand side of the same assignment statement. Our compiler checks for such a situation.

More on the Combination Function

A straightforward method to implement a combination function would generate the truth table of the input conjunction but that may result in many cases. Given the independence of domain variables and the properties of the predicate functions of a domain data type, one can often develop efficient algorithms for combination functions.

For example, consider the domain data type of integers and their usual predicate functions of "equal to", "greater than", "greater than or equal to", "less than", and "less than or equal to." These predicate functions establish a partial orderings of the domain variables used in them. The combination function algorithm would order the domain variables as specified by the predicates and check for contradictions such as when a variable is both greater than and less than another variable.

Efficient algorithms exist for common domain data types such as enumeration, set, tree and ordered or linked lists.

Event Interface

The interface defines a set of event types. Each event type is given a unique name and a data structure. Some fields of the data structure can be identified as qualifying variables. Similar to a domain variable, a qualifying variable is either BOOLEAN or is a variable of a domain data type. FIG. 3 shows the telephony "Termination_request" message as an example event type. The message carries the calling party's number as a qualifying variable.

An event is sent to an instantiation of a feature package. It may come from a program unit in the package or from some program outside of the package. A program unit looking for a particular event specifies that in an event statement that is part of its condition part.

FIG. 4 gives an example model for the implementation of telephone call processing system.

A model defines the domain of discourse for the specifications in the condition part of a program unit. The following describes a program unit in more detail.

Program Unit

A programmer uses the keyword unit and a name to identify a program unit. Program units belonging to the same feature have unique names.

Each program unit consists of a condition part and a program body part.

Condition Part of a Program Unit

The condition part consists of a condition statement and an event statement.

Condition Statement

The condition statement is a BOOLEAN formula of atoms of domain variables. In other words, the condition statement is a first order predicates formula, except that we do not use the existential and universal quantifiers. When the programmer has the need to specify something like "there exists an element in a set", we ask the programmer to specify a predicate function, say non-empty (x), for a domain data type "set". We shall later refer to this kind of formula as a simplified predicate formula.

We follow the convention that when an atom that is defined in the model but not used in a condition statement, then the value of the atom does not affect the truth-value of the condition statement. In other words, the atom is a "don't care."

Event Statement

The event statement identifies a list of interface event types defined in the model statement of the feature.

Each event in the list may be associated with a BOOLEAN formula, called a qualification, on the qualifying variable of the event. Hence, this is also a simplified predicate formula. The event statement is true if the event is present and the values of the qualifying variables carried by that event satisfy the qualification. If a qualification is not specified, the specification is true if the event is present.

As a short hand, the programmer may specify with the key word "any" to denote that the event statement is true given the presence of any event defined in the model. The programmer may attach a qualification denoted by "any". In that case, the event statement is true when given the presence of any event with qualifying variables that satisfies the qualification.

The programmer may also specify the keyword "null" to denote that the program unit is not waiting for an event. As a result, as soon as the condition statement of the program unit becomes true, the program body will get executed.

A condition statement becomes true if its BOOLEAN formula is true given the values of the domain variables at the time of evaluation. An event statement becomes true if any of the interface events in the list is current and the BOOLEAN formula on its qualifying variable is true. An event is current if it has been received, but not yet processed, by the run time system and is considered to be the highest priority event at time of evaluation. We will give a more complete definition of current when we describe the run time system. A program unit is ready for execution when its condition statement and event statement are both true.

The condition part of a program unit may be specified graphically. For example, a condition statement may be specified as a Venn diagram or as a more complex formal system such as the one described in Page: 11 "On Visual Formalism," D. Harel, Communications of the ACM, May, 1988.

Figure 5C:
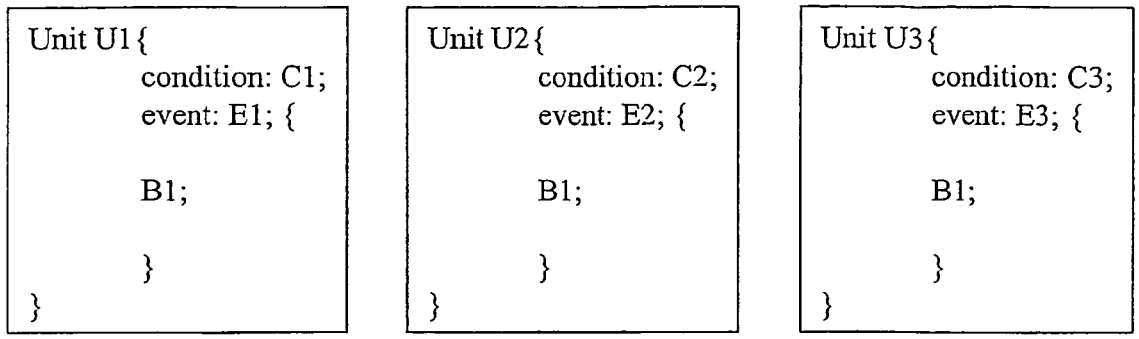
FIG. 5c shows a common program body for several condition and event statement pairs.

As a short hand, we allow the programmer to state the common condition statement or event statement only once for a group of program units. The example given in FIG. 5a shows two program units with the same condition statement. The example given in FIG. 5b shows two program units with the same event statement. It is also possible that a programmer may want to apply the same program body part to different condition statement and event statement pairs. We allow a short hand for this case in which the condition statement will show a disjunction of the condition and event statement pairs. An example is given in FIG. 5c.

The Program Body Part

The program body part contains conventional program statements such as assignment statements, procedure calls, iteration statements and so on, including declaration and operation of variables local to the program unit. These local variables may be automatic or static as used in C and C++. An automatic variable is present while the program unit is being executed and disappears once the program unit exits while a static variable retains its value after the program unit exits. Program statements in a program body may update domain variables, send an interface event within or outside of the model system, or call programs specified in other languages. FIG. 6 gives an example program unit from a telephony application. It simply specifies that if the telephone is in the DIALING state and an Onhook event is received, the switching system should release the digit receiver and put the telephone in the IDLE state.

When a program body updates a domain variable or sends an interface event, it may cause the condition part of some other program unit (even itself) to become true. Because of the combined effect of feature interaction detection and resolution in the development process and the design of the run time system, there is at most one program unit whose condition part is true at one time. Thus, we have a choice of either continuing to execute the current program body or switching to execute the program unit whose condition part has just become true. We choose the former. In other words, we consider the execution of a program body atomic. Events sent from the current program body are kept in a queue. Only after we exit from the current program body will we evaluate the condition parts of other program units using the latest values of the domain variables. We will return to this topic in more detail when we describe the run time system.

Program units are written to implement a certain feature of an application. We now turn to describing features.

Features

We distinguish two types of features: anchor features and supplementary features. An anchor feature provides a starting point for an application. A supplementary feature adds new functionality to the application. Using telephony as an example again, the program units that implement the plain old telephone service (POTS) would be organized as an anchor feature while program units that implement the 3-way calling service would be organized as a supplementary feature.

Special Requirement for an Anchor Feature

We require that the condition part of at least one program unit belonging to an anchor feature is true with respect to the initial values of the domain variables defined in the model.

Special Requirement for a Supplementary Feature

A supplementary feature must identify at least one anchor feature and at least one program unit of the supplementary feature must interact with one program unit of every anchor feature that the supplementary feature refers to.

The compiler can check for both requirements. We will later describe the algorithm to determine whether two program units interact with each other for the supplementary feature requirement. Checking the anchor feature requirements is straightforward.

In the following, we describe the notion of anchor feature in detail. When we describe supplementary feature, we will only highlight how it is different from an anchor feature.

Anchor Feature

A programmer identifies an anchor feature by using the keyword Anchor Feature and a name. An anchor feature consists of two parts: a reference declaration and a program units' list. A feature may accept a list of pass-by-value arguments that are only used by program units within the feature.

Reference Declaration

Here the programmer declares the model used by the feature. In addition, the programmer may declare and initialize local variables that are used only by program units within the feature as well as for the arguments. Space for these variables is allocated when the feature package is created until the feature package exits.

Program Units' List

The program units' list identifies the program units that belong to the feature. The programmer does not specify the execution flow of the program units, but may specify the precedence for a subset of the program units belonging to the feature.

Precedence of Program Units

Two program units are said to have a precedence relationship if they are ordered for execution when both of their condition parts become true at the same time. The precedence relationship is specified in a precedence list. If there are several program units in a precedence list, the relationship among the program units is a partial ordering.

One can design various kinds of precedence lists that preserve the precedence relationship among program units. For example, a straight-precedence (P1, P2, P3) for program units P1, P2 and P3 implies that if the condition parts of P1 and P3 are true, only the program body of P1 will be executed. On the other hand, a priority-precedence (P1, P2, P3) implies that if the condition parts of P1 and P3 are true, then the program bodies of P1 and P3 will be executed in the order specified.

A program unit may appear in more than one precedence list. As a result, two program units that are not in the same precedence list may still have a precedence relationship. It is possible that the programmer may specify contradictory precedence relationships such as specifying P1 precedes P2 in one list but implying P2 precedes P1 in another list. Since all precedence lists specify partial orderings, the compiler can check for such contradictions. Algorithms in doing so are well known, e.g. see D. E. Knuth, "The Art of Computer Programming, Volume 1, Fundamental Algorithms," Addision-Wesley Publishing Company, 1973.

The semantics of precedence lists may also lead to contradiction. For example, suppose that we have straight-precedence (P1, P2, P3) and priority-precedence (P1, P3, P4). When the condition portions for both P1 and P3 become true at the same time, the straight-precedence list requires execution stops after P1 but the priority-precedence list requires execution to continue for P3. Therefore, the design of a precedence list should be accompanied with an efficient method of determining semantic contradictions.

Writing a Precedence List as Program Units

Figure 7A:
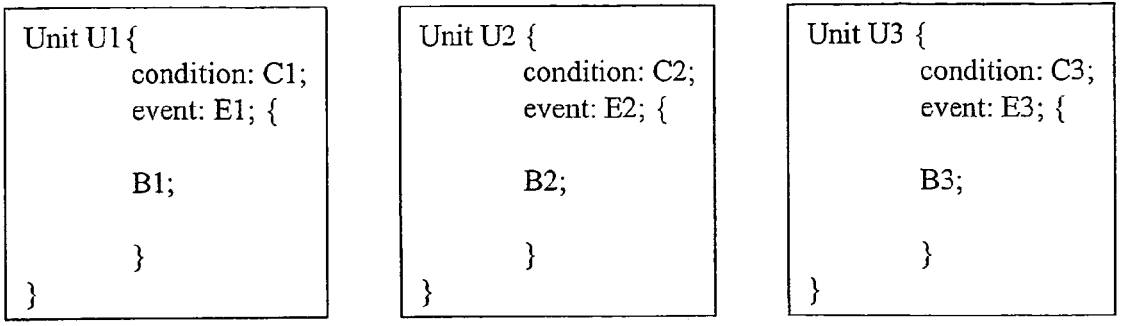
FIGS. 7a and b show example precedence lists and their conversion to program units.
Figure 7B:
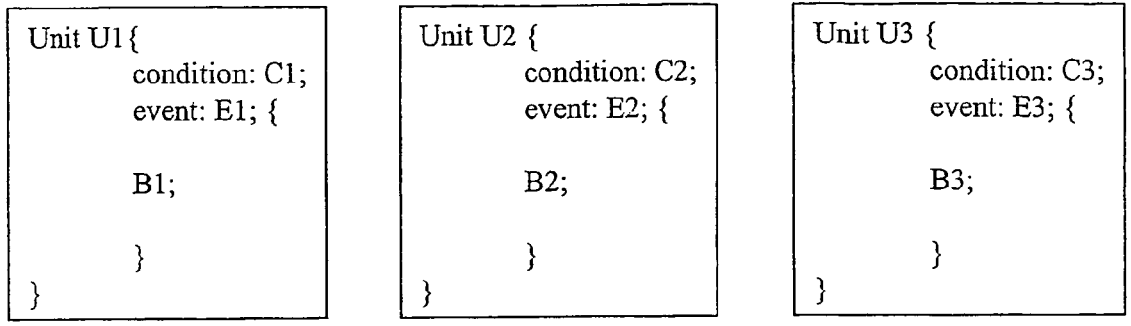
FIG. 7b shows an example of converting a set of priority-precedence list into program units.

One can rewrite a precedence list as a collection of program units as follows. The condition statement of the new program unit is the disjunction of the condition and event statement pairs of the program units in the list. Its program body contains conditional statements that will execute the appropriate program bodies of the program units in the list. An example is given in FIG. 7(a) for a straight precedence list and in FIG. 7(b) for a priority precedence list.

What we are saying is that a collection of program units and a precedence list may be made equivalent.

Program Unit Interaction and Well-Formed Features

Two program units belonging to the same feature interact with each other if and only if they do not have a precedence relationship and their condition parts can become true at the same time. Later we will give an algorithm to detect feature interaction.

In our system, if interaction among two program units is not resolved, the run time system will not be able to determine which program to execute when both of their condition parts become true. There are a number of ways a programmer may resolve the interaction among two program units such as putting them in a precedence list and rewriting their condition parts. A feature that has no interacting program units is called a well-formed feature.

Supplementary Feature

A programmer identifies a feature with the keyword Supplementary Feature and a name.

A supplementary feature is similar to an anchor feature with three exceptions. (1) A supplementary feature must identify its anchor feature in its reference declaration. (2) A feature is not required to have the condition statement of some of its program units to be true given the initial values of the domain variables. (3) A supplementary feature should be reachable from its anchor feature. Feature A is reachable from feature B, if after B is invoked, there exists a computation that will lead to some program units in A getting executed. A necessary condition for a supplementary feature to be reachable from the anchor feature is that there exists a program unit in the anchor feature and a program unit in the supplementary feature such that the conjunction of the condition statements of these two program units is satisfiable.

FIG. 8 gives an example supplementary feature. It implements the telephony feature of "Call-Forwarding". The example shows the program units to activate and deactivate the feature as well as the program unit that will forward an incoming call when the call forwarding number has been specified and the incoming call does not come from the forward-to-number.

A well-formed anchor feature by itself is executable. But typically, the programmer would put several features together in a feature package to give an application rich features.

Feature Package

The programmer uses the keywords Feature Package and a name to identify a feature package. The feature package may accept a list of arguments. The arguments are passed by value only.

A feature package contains a reference declaration, and a list of program units.

Feature Package Reference Declaration

In this portion of the feature package, the programmer specifies the model that is used by all the programs and the list of features included in the package. The list of features must include at least one anchor feature and all features in the package must reference at least one of the anchor features in the package. The compiler checks for these two requirements. A feature package may include another feature package in its feature list. The feature package inclusion relationship is a partial ordering. The compiler can efficiently check circular inclusion when two feature packages (transitively) include one another.

In addition, the programmer may define the type of arguments and local variables used by the programs in the feature package.

Feature Package List of Program Units

The list of program units identifies the program units belonging to the feature package. One important purpose of these program units is to resolve interaction among features. Thus, the list of program units may include precedence lists for program units and precedence lists for features, which are both short hands for program units that resolve interactions. We already described precedence lists for program units.

Precedence Lists for Features

The programmer uses a precedence list for features to specify precedence relationship among program units in the different features. If feature F1 precedes feature F2, then if the condition parts of a program unit P1 belonging to F1 and another program unit P2 belonging to F2 become true at the same time, P1 will get executed before P2.

Similar to precedence lists of program units, one may specify different types of precedence lists for features. For example, a straight-precedence (F1, F2, F3) for features F1, F2 and F3 implies that if a condition part is true for some program units in F1 and F3, the program body for the unit in F1 will be executed. A priority-precedence (F1, F2, F3) implies that if the condition part for some program unit in F1 and F3 becomes true, the program bodies of the units in F1 and F3 will be executed in the order specified. Precedence list for features does not change the precedence relationship specified by the precedence lists of the individual features. One can trivially generate the partial ordering of all the program units specified by the precedence lists of features and program units.

The compiler will be able to check for contradictions in these lists.

Feature Interaction and Well-Formed Feature Package

Two features, F1 and F2, interact with each other if and only if they do not have a precedence relation and a program unit in F1 interacts with a program unit in F2. A programmer can resolve feature interaction by putting interacting features, or the interacting program units, in a precedence list. Alternatively, the programmer can write a program unit for the feature package on the condition that these two program units interact to resolve the interaction. We do not recommend resolving the interaction by modifying feature program units.

A feature package is well formed if none of its program units interacts with one another and none of its features interacts with one another. A well-formed feature package is executable.

FIG. 9 gives an example feature package that combines the POTS, Call-Forwarding and Do-Not-Disturb telephony features together. The precedence list gives priority to program units of the feature package, then those of Do-Not-Disturb, Call-Forwarding and finally POTS. Both Do-Not-Disturb and Call-Forwarding may be invoked when a Termination-request event is received. The "interaction-resolution" program unit resolves the interaction by either forwarding the call or return do not disturb action depending on whether the calling party is a member of the privileged set.

As time goes on, even a well-designed model may become inadequate. For example, the programmer may want to develop voice and data services on a telephone line. The original voice only telephony model will no longer be sufficient. When that happens, a new model becomes necessary, but the programmer may still want to reuse existing feature code implemented with the original model.

To enable the reuse, our method allows the development of a new model extending from an old model and new features and feature packages extending from existing features and feature packages that uses the old model.

Extension

The purpose of extension is to reuse features written for an existing model. There are two levels of extension: creating a new model from the original model, and creating feature packages for the extended model reusing existing features written for the original model.

Model Extension

A programmer may extend the original model by adding new domain variables or interface events, and by extending the definition of existing domain variables or interface events.

When extending the definition of an existing domain variable or interface event, the programmer may either add new elements to the existing definition or extend the range of values of the domain variable or qualification. As an example of adding new elements to an existing definition, consider the event "Termination-request" of the example model shown in FIG. 3. The existing data structure of the event may contain only one field, "calling-party". The extended definition may add a new "type of service" field to identify whether the calling party is requesting a voice or data connection. As an example of adding the range of values of an existing definition, the programmer may add the value "POST-ANNOUNCEMENT" to the enumeration defining the range of values for the domain variable "state" used in the example model of FIG. 4.

We require that the programmer cannot eliminate existing elements nor reduce existing range of values. The programmer uses the following syntax to specify extensions to an existing model:

```
Model new-model-name extends existing-model-name {
    Domain variables:
        /* Definition of new domain variables and/or extensions to
existing domain variable definition */
    Interface events:
        /* Definition of new interface events and/or extension to
existing interface event definition */
};
```

In the above statement, Model and extends are keywords and new-model-name and existing-model-name are the names of the new and original models respectively.

The extended model includes all the domain variables and interface events defined in the existing model. These domain variables and interface events possibly have new elements or additional value ranges. In addition, the extended model may have new domain variables and interface events. The new additions and existing definitions are all available to program units using the extended model.

FIG. 10 gives an example model extension for voice and data calls built on top of the (voice only) telephone model. The new model extends the voice-connection STATE domain data type. It adds a new domain variable for the data connection states and defines new data interface events.

Feature Extension

After the extended model is specified, a programmer may reuse features written for the original model in a feature package for the extended model. To do so, the programmer includes the reused features in the feature list of the new feature package. The program units of the reused feature become program units of the new feature. Precedence relationship among the program units of the reused feature is preserved. The new domain variables and interface events, as well as new variable elements or extended value ranges, of the new model are "don't cares" to these reused program units.

The programmer may add conditions on the new domain variables and interface events to a reused feature by attaching a qualification next to the feature name in the feature list in the following manner:

Feature: reused-feature {qualification}, another-feature;

A qualification in this context consists of two statements: a condition statement and an event list that are specified in exactly the same syntax as those in a program unit. It modifies the condition part of the program units of the reused feature. The list of events in its event statement will now include the events specified in the qualification. If the programmer precedes the condition statement of the qualification with the symbol AND, the condition statement of the program unit becomes the conjunction of its original condition statement and the condition statement of the qualification. If the programmer precedes the condition statement of the qualification with the symbol OR, the condition statement of the program unit becomes the disjunction of the two condition statements. The programmer may attach different qualifications to different subsets of program units of a reused feature in the following manner:

```
Feature: reused-feature {(program-unit1, program-unit2)
    {qualification1},
        (program-unit3, program-unit4 .. program-unitN)
    {qualification2}};
```

FIGS. 11a and b give an example of a feature for the extended model of FIG. 10 reusing POTS of the original model. The new feature takes advantage of capability of the extended model for the user to specify a PIN. It then takes advantage of the new POST-ANNOUNCEMENT state of the extended model to verify whether the calling party can enter the correct PIN within 15 seconds.

The Software Development Process

The software development process includes these steps:

(A) The programmers develop a model of the application.

(B) Based on the model, the programmers develop a set of anchor features.

(C) As each program unit of an anchor feature is written, an interaction detection tool is invoked to check whether the newly completed program unit interacts with previously completed program units. Alternatively, the interaction detection procedure may be invoked to check possible interaction after some subset of the program units is completed.

(D) The programmer resolves feature interaction among the program units of an anchor feature. When the feature interaction detection tool finds no more feature interaction among its program units, the anchor feature is a well-formed anchor feature. A well-formed anchor feature is executable.

(E) Based on the model and one or more anchor features, the programmers develop a set of supplementary features.

(F) For each supplementary feature, its programmer applies the interaction detection and resolution procedure until all interactions among the program units of the feature have been resolved, making the feature a well-formed feature.

(G) The set of well-formed anchor features and supplementary features of a model are library components. A programmer picks a set of anchor features and supplementary features (later, we shall refer to them collectively as features) for a feature package.

(H) The programmer invokes a feature interaction detection procedure that checks whether the set of features included in the feature package interact with each other.

(I) The programmer resolves the interactions. After all feature interactions are resolved, the feature package is called a well-formed feature package. A well-formed feature package is executable.

Figure 12:
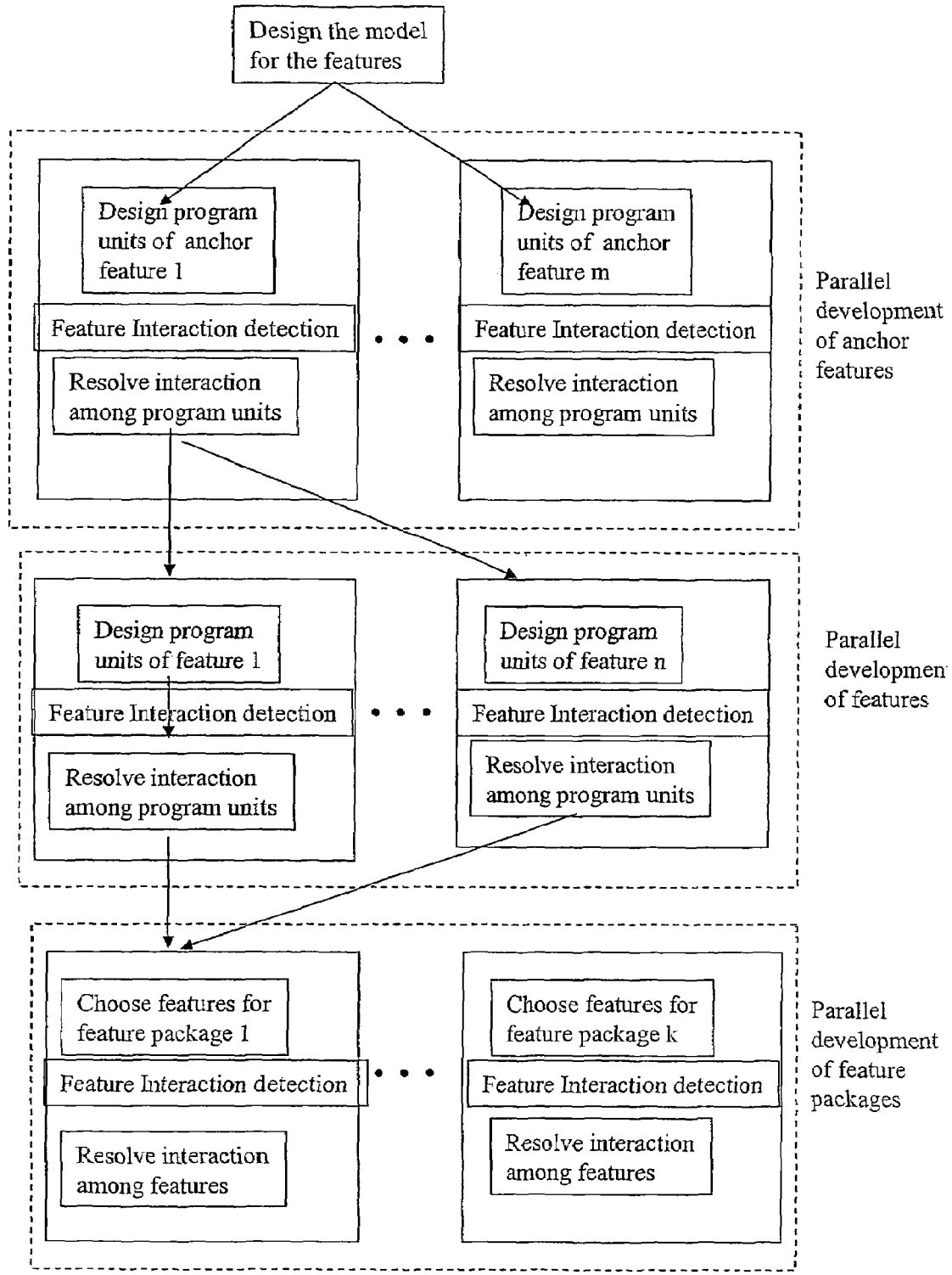
FIG. 12 illustrates a procedure of developing software using this method. It shows the parallel development possible with this method.

This development process is depicted as a flow chart in FIG. 12. We note that anchor features can be developed independently without requiring changes to other anchor features. Similarly, supplementary features can be implemented independently of one another. The integration of features occurs when they are put together into a feature package. Putting features together in a feature package does not require changing feature code even though the features may change the execution flow of each other.

The development process of writing an extended model and its features and feature packages is the same process as described earlier.

Interaction Detection

We exercise interaction detection under two occasions. First, we check for interaction among program units in the same feature. Second, we check whether any program unit in one well-formed feature interact with another program unit in another feature when both features are put together in a feature package. In this section, we describe a procedure of carrying out the interaction detection of two program units.

Program Interaction Condition

Earlier, we defined two programs as interacting with each other if when they are put together, one would change the execution flow of the other. Given the semantics of our programming language constructs and the run time system, one can show that two program units interact with each other if and only if the condition part of them can become true at the same time, and they do not have a precedence relationship.

While we can check for the above condition, it involves showing "reachability" which is computationally intensive. We use the following sufficient condition instead.

Simple Interaction Condition (SIC):

If two program units interact then:

(1) they wait for the same event and the conjunction of their qualification with respect to that event is satisfiable;

(2) the conjunction of their condition statements is satisfiable; and (3) they do not have a precedence relationship.

Interaction Detection Algorithm

Given two program units, X and Y, the following algorithm checks for their SIC.

---
Algorithm 1:
---
If (X and Y have a precedence relationship)   note 1
   then return (no SIC);
   else {
      if (the event lists of X and Y do not contain the same events)
         then return (no SIC);
         else {
            for (each common X and Y event)   note 2
               check (if the conjunction of their
                  qualification is satisfiable);
            if(no conjunction of qualification is satisfiable)
               then return (no SIC);
               else { check (if the conjunction of   note 3
                  the condition statements of
                  X and Y is satifiable);
               if (not satisfiable)
                  then return (no SIC);
                  else (report conjunction of
                     condition statements
                     and qualifications as
                     SIC conditions);
            }
      }
   }
---

Figure 13:
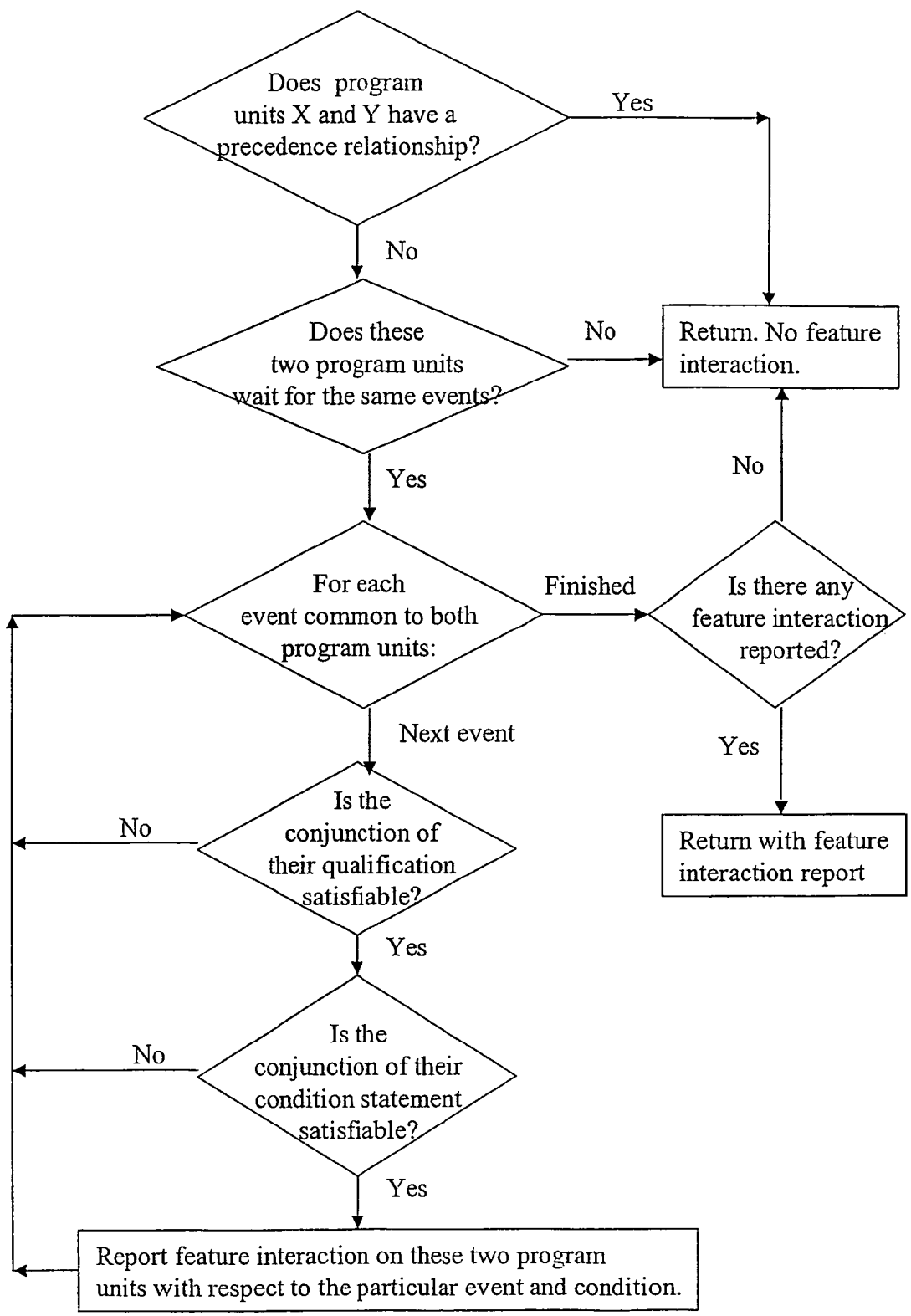
FIG. 13 gives the flowchart of Algorithm 1, which checks for the simple interaction condition between two program units.

A flowchart for Algorithm 1 is given in FIG. 13.

To determine whether two program units have precedence relationship (note 1 in algorithm 1) is relatively straightforward. The precedence relationship is a partial ordering and can be readily determined by analyzing the precedence lists (see, e.g. D. E. Knuth, "The Art of Computer Programming, Volume 1" Addison-Wesley Company, for methods of processing partial ordering).

note 2 and note 3 in algorithm 1 identify the need for a procedure to determine whether the conjunction of two simplified predicate formulas, say M and N, is satisfiable. Algorithm 2 solves that problem ---
Algorithm 2
---
Step 1: Derive a disjunctive normal form D(M) of M;
Step 2: Derive a disjunctive normal form D(N) of N;
Step 3: For each term in D(M), check whether its conjunction with every term in D(N) is satisfiable; We denote the $i^{th}$ term resulting from this conjunction as E(M, N)(i).
Step 4: If (none of the E(M, N)(i) checked in Step 3 is satifiable)
        then return (conjunction of M and N not satisfiable)
        else return (conjunction of M and N satisfiable and with a report
          on all satisfiable conjunctions determined in Step 3).
---

Figure 14:
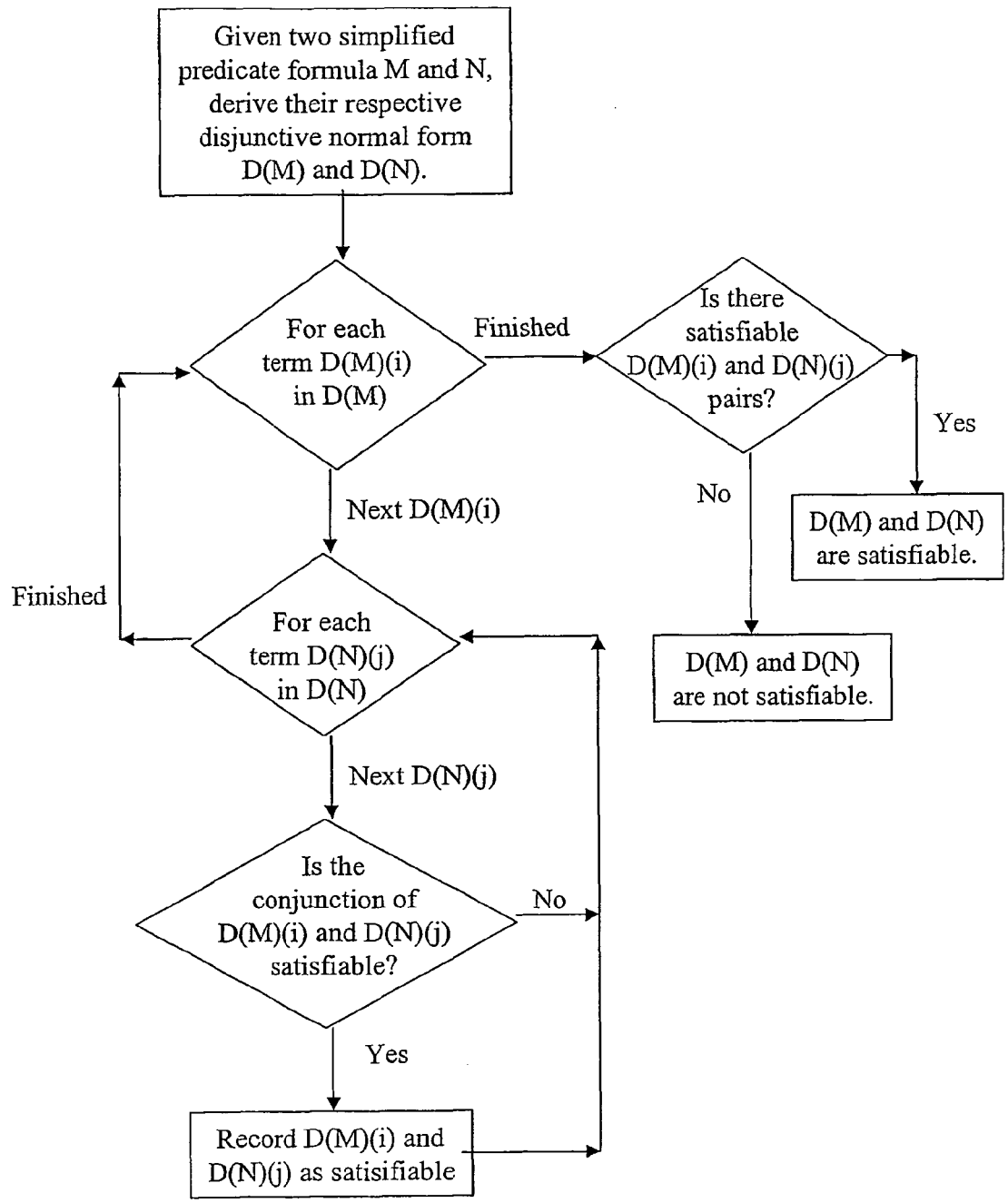
FIG. 14 shows the flowchart of Algorithm 2, which checks for whether the conjunction of two simple predicate formulas is satisfiable.

A flow chart of Algorithm 2 is given in FIG. 14.

Given a BOOLEAN formula, the procedure to derive its disjunctive normal form is well known. A disjunctive normal form is written as the disjunction of a set of components, "C1 V C2 V . . . Cn", where each component Ci is a conjunction of literals or negation of literals, such as "p1 $\wedge$ ~p2 $\wedge$ p3".

To evaluate Step 3, we note that the only logical operator used in E(M, N)(i) is the conjunction which is associative. Hence we can rearrange the literals of E(M, N)(i) according to whether they belong to the same domain data type. Then for each group of predicate literals, we call the combination function of its domain data type.

We note further that: (1) The conjunction of the same variable, say A, is given by (A AND A)=A; (A AND ~A)=FALSE; (~A AND ~A)=~A. (2) The conjunction of two different BOOLEAN variables is satisfiable as the variables are independent. (3) A BOOLEAN literal by itself is satisfiable. As a result, we have the following procedure to evaluate Step 3 of Algorithm 2.

---
Algorithm 3
---
1. For each E(M, N)(i), group literals belonging to the same domain data type together.
2. Evaluate each group using their respective combination functions, or in the case when they are BOOLEAN variables, look for contradiction. If any group evaluates to FALSE, return (not satisfiable) else return (satisfiable).

---

With this, we show a method of detecting the SIC between two program units.

Figure 15:
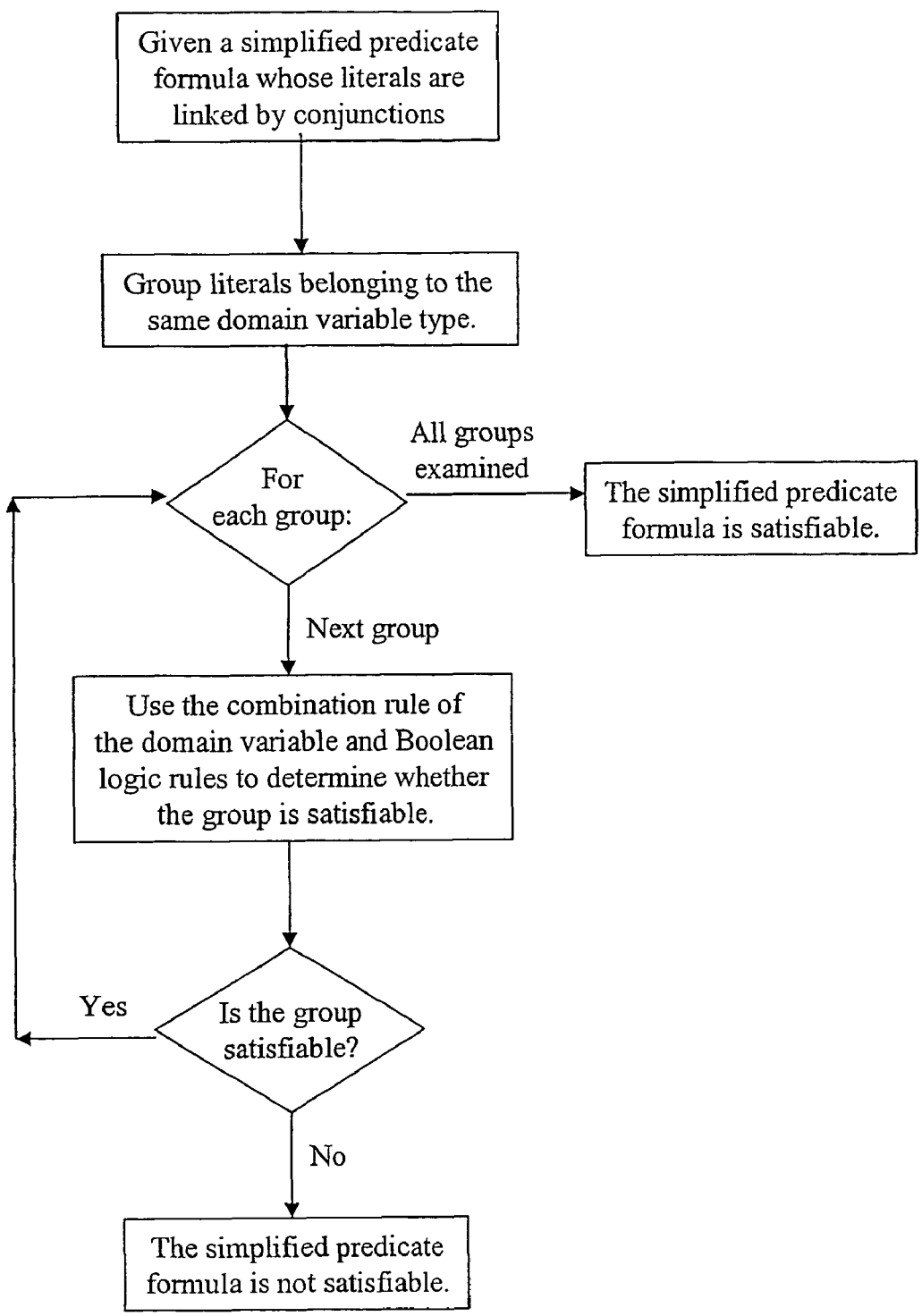
FIG. 15 shows the flowchart of Algorithm 3 which checks for whether a term in a disjunctive normal form is satisfiable.

A flowchart of Algorithm 3 is given in FIG. 15.

Applying Algorithm 1, 2 and 3 together determines whether two program units interact with each other. If two program units are shown to interact with each other, step 4 of Algorithm 2 identifies the condition in which they interact.

Summarizing this section, SIC is a sufficient condition. When two program units are found to have no SIC, then either they belong to the same precedence list or their condition parts cannot become true at the same time. This is true for any two program units in a well-formed feature or feature package.

The Run Time System

The purpose of the run time system is to manage the execution of program units. Without loss of generality, an executable object in our language is a well-formed feature package. A program unit in the feature package is ready for execution if its condition part becomes true unless it belongs to a precedence list. In the latter case, the precedence list is ready for execution. We showed earlier that a precedence list could be written as program units. To simplify our discussion, we assume that all precedence lists have been rewritten as program units. In other words, the feature package contains only program units. Furthermore, since the feature package is well formed, if the condition statements of two program units can be true at the same time, then their event lists cannot be true at the same time.

For simplicity, we describe the run time system for the execution of a single feature package. Those who are familiar with the art of multiprocessing operating systems can easily extend our result to a run time system that executes several feature packages concurrently.

The fundamental operations of the run time system are relatively simple: First, it initializes the system. Then after initialization and each time after it completes the execution of a program unit, it checks for the arrival of events, updates the domain variables that have been changed as the result of executing the program unit and searches for whether the condition part of any of the program units has become true. There can be at most one such program unit. If there is one, the run time system will execute it to completion. If not, it waits for another event. When an event comes, it searches for whether the condition part of any program has become true. It repeats these operations until it executes an exit command from a program unit.

The following algorithms, however, describe a fairly optimized run time system, especially in the operation that searches for a program unit whose condition part has become true. The performance of a naïve search operation degrades rapidly with the number of literals used in the system. We use a set of registers and use each bit in the register to represent a literal, such that the truth value of many literals (as many as the length of the registers) can be checked at one time.

We first describe the various data structure used by the run time system before going through the algorithms.

Data Structures Used by the Run Time System for Program Units Execution

We describe three sets of data. One set is global to all program units. The second set is specific to each event type. The third set is specific to particular program units.

Per Feature Package Data

The run time system maintains a common state register (CSR) which contains the truth values of all the distinct literals used in the condition statements of the program units belonging to the feature package. We consider the same predicate function on two different domain variables (or different sets of domain variables) to be two distinct literals. Since each of these literals may only have the values of TRUE or FALSE, the CSR uses one bit for each literal. The CSR is dynamic data. Its value changes when domain variables are updated during execution of the feature package.

Figure 16:
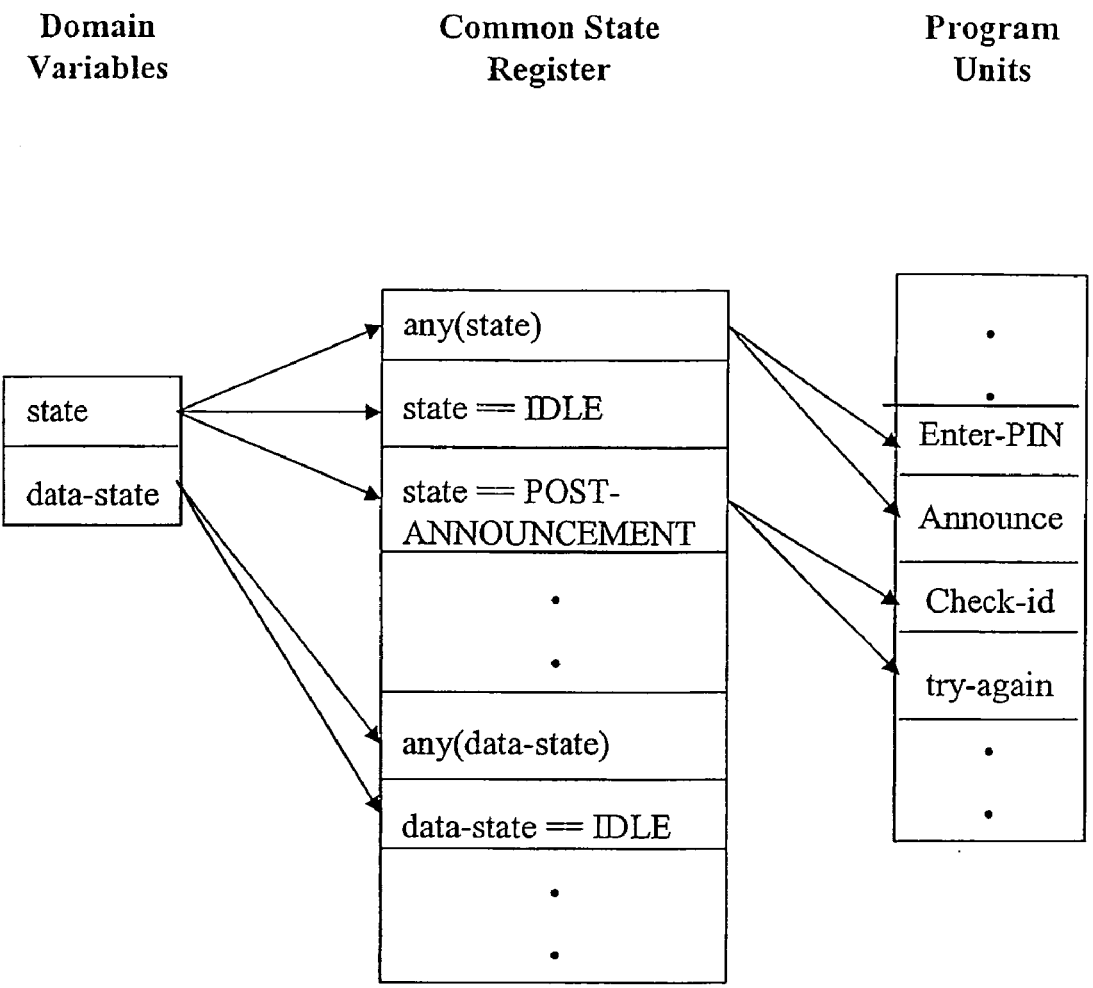
FIG. 16 shows the table that associates a domain variable, its location in the CSR and the set of predicate functions that use it.

For efficient processing, the run time system may rely on some static data prepared by the compiler. We associate each domain variable with the set of predicate functions that use it at the corresponding location in the CSR and the program units that uses the CSR literals in their condition statement as shown in FIG. 16. When the run time system desires, it can use this data structure to easily update CSR and the status of the program unit condition statements with the current value of the domain variables.

Per Event Type Data

Figure 17:
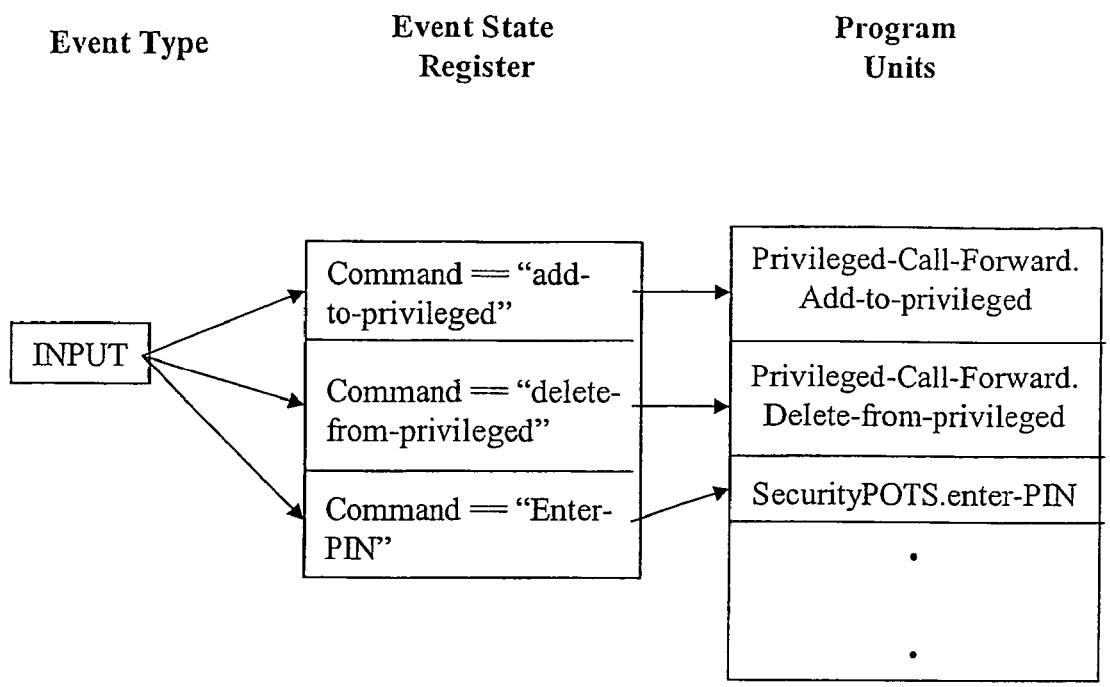
FIG. 17 shows the table that associates an event qualifying field, its location in the ESRP and the set of predicate functions that use it.

For each event in the event queue, the run time system maintains an event state register (ESR) analogous to the CSR but for event qualifications. The ESR follows the format of an ESR template (ESRT) generated for all events of the same type. For each event type, we associate each qualifying field with a set of predicate functions that uses it and the corresponding location in the ESRT as shown in FIG. 17. Using the table in FIG. 17, when an event of a particular type arrives, it is straightforward for the run time system to generate the values of its ESR.

For each event type, we maintain a list of program units that refer to the event type in their event statements.

Per Program Unit Data

For each program unit, we keep two sets of static data generated from the feature interaction detection process. One set comes from the condition statement and the other from the event statement.

First from the condition statement: For each term in the disjunctive normal form of the condition, we construct a unit condition register (UCR) that records the values of the variables that satisfy the term. Since the variables used in the term are a subset of the variables represented in the CSR, one possible implementation of the UCR will use a vector the same dimension as the CSR and record the values of the variables in exactly the same position as in the CSR. The values of the other bits in the UCR will be set to FALSE.

Associated with each UCR, we construct a unit mask register (UMR) to indicate the position of the variables used in the term. In other words, the UMR has the same dimension as the CSR and UCR. The UMR has the value TRUE in the positions corresponding to variables used in the term, and it has the value FALSE in the positions of other variables.

Given a UCR, and its corresponding UMR, we have a simple method to determine whether the CSR satisfies the UCR as given in Algorithm 4. We will state Algorithm 4 more generally because it will be used in another context. Given a register A, each bit of which represents the value of a distinct BOOLEAN variable. Given another register B having the same dimension as A and each bit of A and B in the same position represents the same variable. If B records the values of variables that will satisfy a BOOLEAN formula M and another register C represents the variables used in the formula with TRUE and FALSE otherwise, then Algorithm 4 determines whether the values in A satisfy M.

Algorithm 4:

1. Do a bit by bit logical AND operation between A and C, and record the result into a temporary vector of the same dimension. At the end of the operation, the temporary vector has a value of FALSE on every variable not used in the term and the same value as in A on every variable used in the term.
2. Do a bit by bit logical EXCLUSIVE OR between the temporary vector and B. If the two vectors matches exactly (i.e. the result of the EXCLUSIVE OR is zero for all bits), then A satisfies M, else it does not.

From the event statement: For each event, we construct event qualification registers (EQR) and their corresponding event mask Registers (EMR) analogues to the UCR's and UMR's of the conditional statement. One can use Algorithm 4 to determine whether a given ESR satisfies an event qualification.

Run Time System Algorithms

We are now ready to describe an example run time system. The run time system operates on three states: the initial state when the run time system is first created, the active state when it is executing a program unit, and the idle state when it is waiting for an event to make the condition part of some program unit true. Once it is initialized, the run time system is invoked under two situations: when it receives an event or when the program unit that is under execution returns.

Initial State

When a feature package is created (some programming languages use the term instantiated) for execution, the operating system will allocate space for the local variables declared in the feature package and its features. Given the initial values of the domain variables as specified in the model statement, the compiler or the operating system can compute the initial value of the CSR via the data structure shown in FIG. 16.

Since a feature package must contain at least one anchor feature, there exists at least one program unit whose condition statement satisfies CSR. Compare this CSR with the UCR and UMR of all program units using algorithm 4, we can determine these program units and put them into a current list of program units. As mentioned earlier, program units in the list do not have event lists that can be true at the same time. At most one program unit in the list is not waiting for any event. If such a program unit exists, the run time system will invoke the execution of the program unit and transition to the active state. If no such program unit exists, the run time system transitions to the idle state. Algorithm 5 describes this sequence of action.

Algorithm 5

1. Allocate space and initialize the domain variables and local variables defined for the feature package, features and program units in the feature package.
2. Determine the value of the CSR.

-continued

Algorithm 5

3. Determine the set of program units in the current list.
4. If (there exists a program unit in the current list not waiting for any events) {
    Run-time-system-state = active;
    Execute the program unit;
    } else {
    If (event queue is not empty) {
        If (there exists an event in the queue that matches a program unit in the current list) {
            Run-time-system-state = active;
            Execute the program unit;
            Exit Algorithm 5; }
    }
    Run-time-system-state = idle;
    Exit Algorithm 5;}

Figure 18:
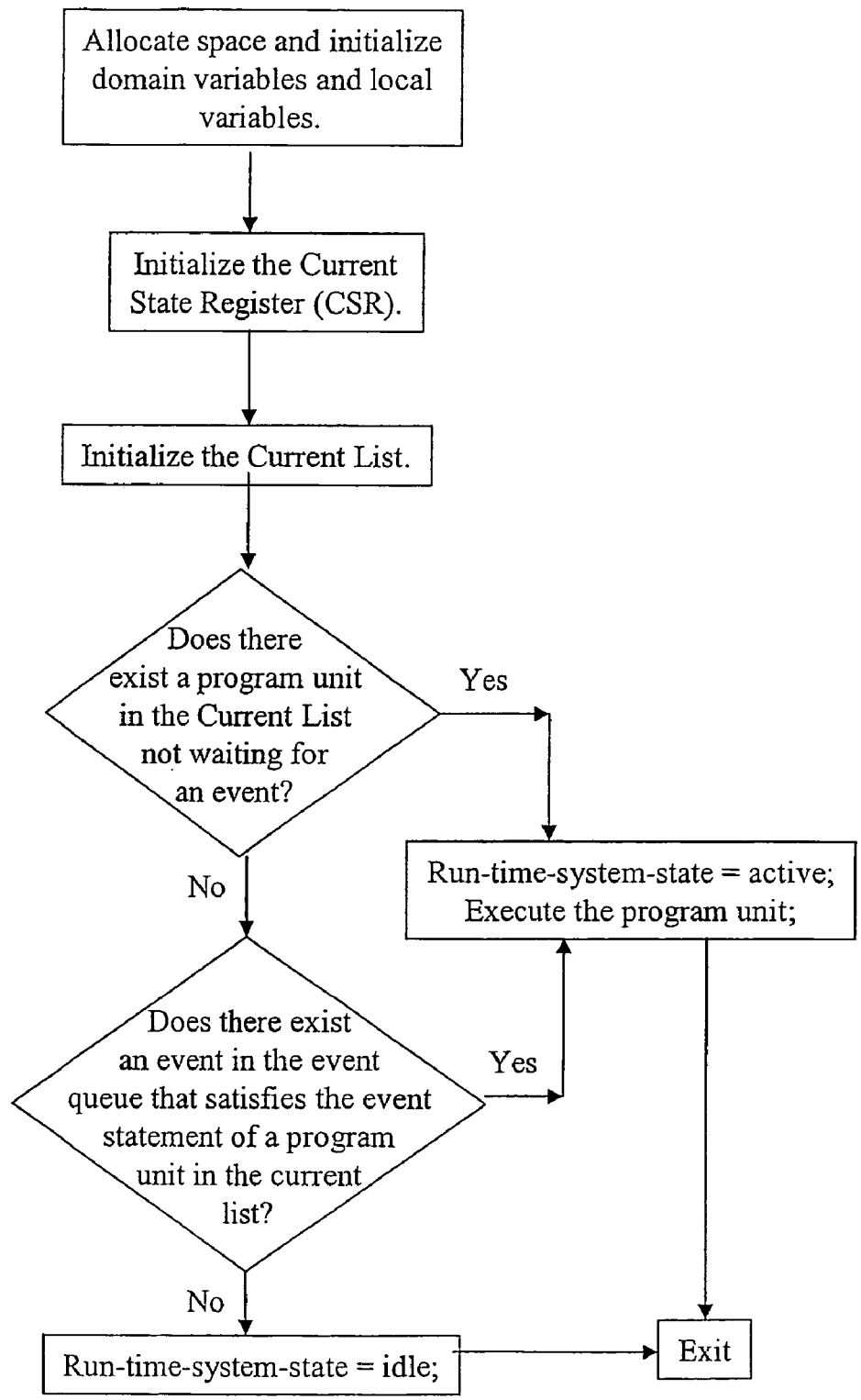
FIG. 18 shows the flowchart of Algorithm 5 that describes the run time system at the initial stage of executing a feature package.

FIG. 18 shows the flowchart for Algorithm 5. Steps 2, 3 and 4 can be done at compile time.

After the execution of Algorithm 5, the run time system will be invoked under two conditions: when the run time system receives an event, or when the program unit being executed returns.

Algorithm 6 (When the run time system receives an event)

Figure 19:
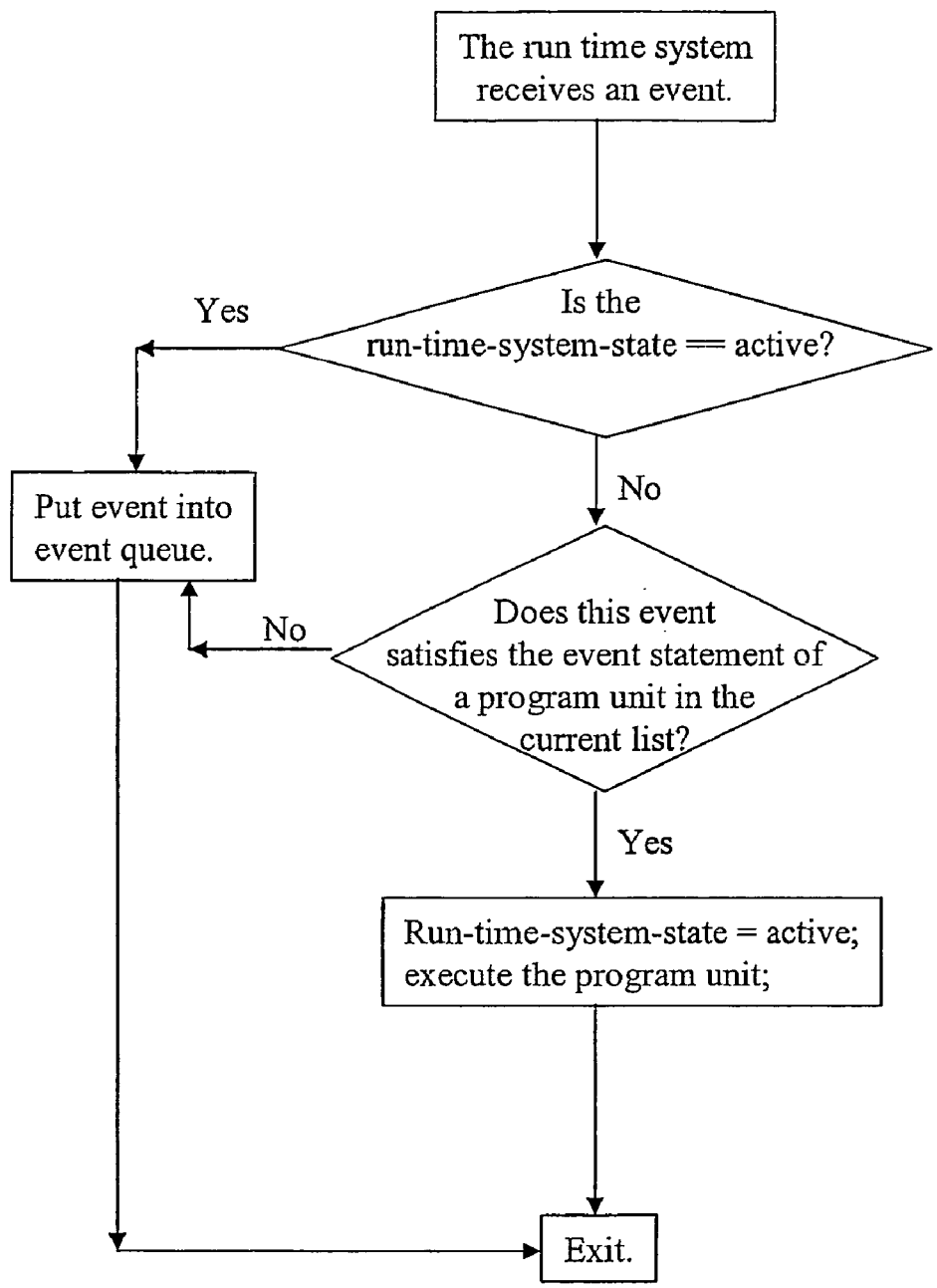
FIG. 19 shows the flowchart of Algorithm 6 that describes the run time system when it receives an event.

If (run-time-system-state == active) {
    put event into event-queue;
    exit Algorithm 6;
} else {
    if ((there exist a program unit in the current list is waiting for an
        event of this type) and (the value of the qualifying variables of
        the event satisfies the event qualification of the program unit)) {
        run-time-system-state = active;
        Execute the program unit;    note 1
        Exit Algorithm 6;
    } else {
    put event into event-queue; exit Algorithm 6;
    };
FIG. 19 shows the flowchart of Algorithm 6.

For the statement in note 1, we check whether the value of the qualifying variables of the event satisfies the event qualification of the program unit by using Algorithm 4 on the ESR of the event and the EQR and EMR of the event qualification. Since program unit is in the current list, its condition statement is satisfied by the current CSR. There can be at most one program unit that satisfies both conditions and that program unit is executed.

The event is put into the event queue if some program unit is being executed at the time or when the event does not cause the condition portion of some program unit to become true.

Algorithm 7 (When the execution of a program unit returns)

Step 1: If (some domain variables have been updated) then {
    update CSR; update current list };
    If (current list is empty) then system terminated;
Step 2: If (event-queue is not empty) {
    Select one event from event queue that satisfies the event
        statement of a program unit in the current list;
    If (no such event can be found) {
        Run-time-system-state = idle;
        Exit Algorithm 7;
    } else {
        run-time-system-state = active;
        Execute the program unit;

-continued

Algorithm 7 (When the execution of a program unit returns)

Figure 20:
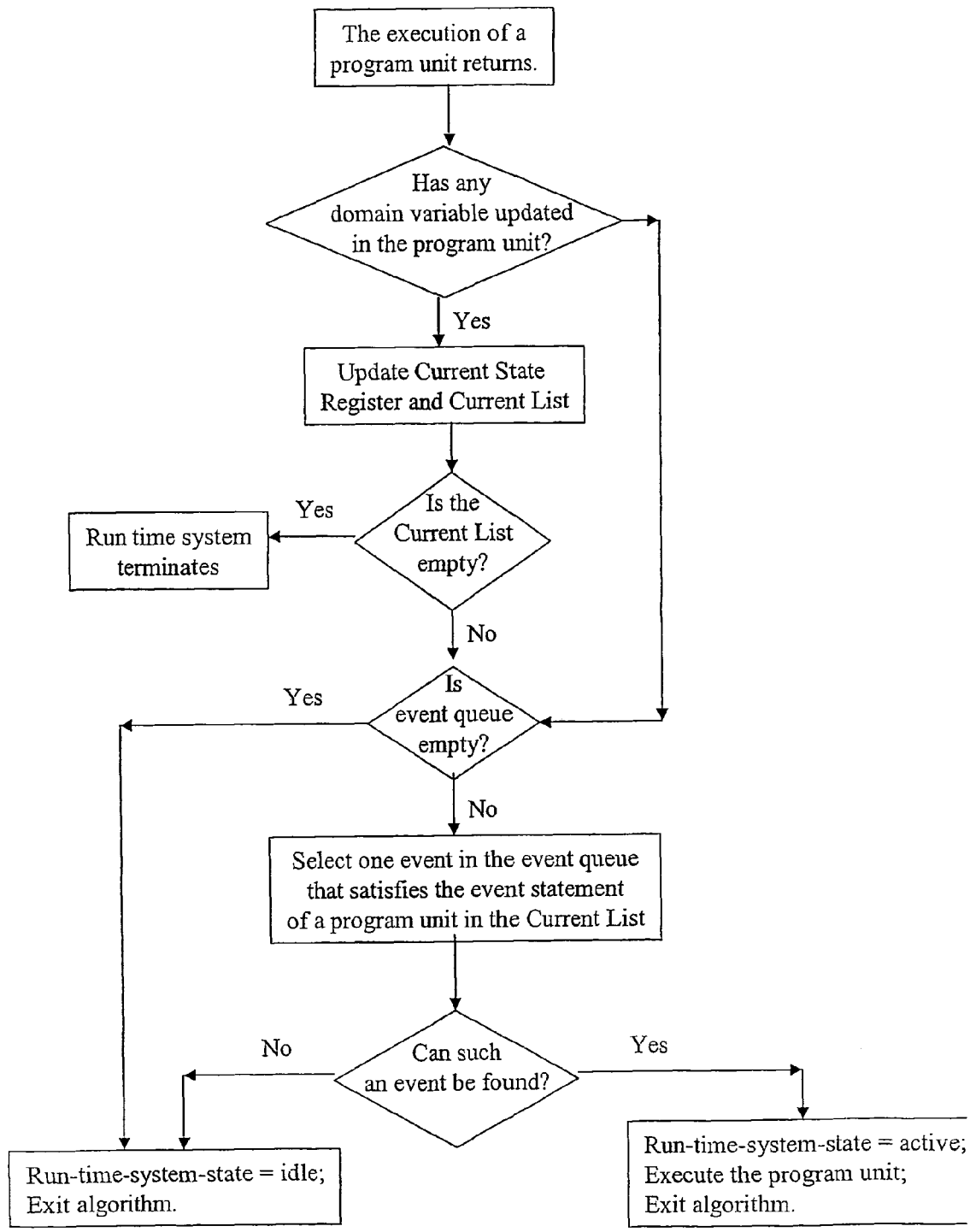
FIG. 20 shows the flowchart of Algorithm 7 that describes the run time system when a program unit returns.

```
            Exit Algorithm 7;}
        };
    } else {
        run-time-system-state = idle;    /* No program unit selected
                                            for execution */
        exit Algorithm 7 }
```
FIG. 20 shows the flowchart of Algorithm 7.

In Step 1, we update the current list by applying Algorithm 4 to the CSR and the (UCR, UMR)'s of each program unit. The computation associates a certain value of CSR to a set of (UCR, UMR)'s. This can actually be done in compile time, especially if the dimension of CSR is reasonable. Also in Step 1, if no condition statement of any program unit is satisfied given a particular value of the CSR, no further computation is possible.

In Step 2, the selection of an event from an event queue can be based on some user defined criteria such as first event received will be first selected, or the first in first selected policy supplemented with priority of the events. When no event in the event queue satisfies the event statement of the program units in the current list, the system will just have to wait for the next event.

In summary, we described a set of algorithms that specify what the run time system should do when it is first created (Algorithm 5), when it receives an event (Algorithm 6) and when the execution of a program unit returns (Algorithm 7). These algorithms preserve two important properties. First, the execution of a program unit is atomic. The run time system does not stop in the middle of executing one program unit and switches to execute another. Second, only one event at a time is processed (take out of the event queue) but we leave the choice of what priority scheme to use open. These algorithms are example algorithms to show feasibility. There are other variations and optimizations possible.

CONCLUSION

We described a set of nonprocedural language constructs, a run time system to execute program units written in these language constructs, an algorithm to detect interaction among the program units, and a process to develop software using this technology. One main purpose of the preceding is to show feasibility of enabling programmers to develop interactive features as reusable components and to add new feature without modifying existing code. Many topics of interest are outside the scope of what is explicitly described herein, but we will briefly discuss two topics: on the performance of the algorithms and on the analysis of programs written in this language.

The careful reader may note that checking for whether the conjunction of two BOOLEAN formula is satisfiable (an essential step in checking for the SIC, simplified interaction condition) is NP-complete. However, today's computers can resolve this problem reasonably fast (less than a minute) for formula with less than twenty literals. However, if programmers use that many literals in their condition statements, they are handling something that they themselves may not understand and probably should avoid. This problem is mitigated in the present method as we need to deal with this only for program units that wait for the same events with compatible qualifying field.

The performance of the run time system algorithms as given should be reasonable. It can be further optimized. For example, we mentioned earlier that the compiler could actually do static analyses to link different values of the common state register (CSR) to different program units. The run time system can learn and remember the current list of program units for a specific value of the CSR at ran time, so that it does not need to determine the current list the next time. The described algorithm of manipulating registers is also quite fast.

Note that the domain variables and their predicate functions specified in a model actually may define an infinite domain of discourse (for example, a domain variable is allowed to be of type integer, which already is infinite). However, the condition statements of the program units of a well-formed feature package will divide the domain of discourse into finite number of partitions. If the condition statement of a program unit defines a partition, the number of partitions in a feature package is at most the number of program units in the feature package. In other words, a feature package is actually a finite state machine. All the analysis algorithms investigated for finite state machines may apply to analyze feature packages.

It is relatively easy to derive the domain of discourse not covered by the condition statements of the program units in a feature package. The run time system algorithms would terminate the feature package when it encounters such a condition. When that happens, it is most likely an exception condition. (The programmer may specify program units that will normally exit from execution.) The programmer can gain more control on that exception by writing a program unit as shown in FIG. 21 and put the program unit at the bottom of the precedence list of a feature. Alternatively, the programmer may write a feature for such exceptions and put it at the bottom of the precedence list of a feature package.

Exception handling is an important topic in programming language design. In many software systems, there exists more code for exception handling than normal processing. This is an area where the present approach is better than conventional programming languages. Since additional language constructs than those already described are not required, this is not elaborated on in this document.

Note that while the application of the method to telephony is presented in particularity, the method may be applied to any program especially those of large numbers of modules and complexity. Internet applications are prime examples of such programs. Altering the functionality of shopping carts is one such non-trivial programming problem that can make use of the present method.

While the language constructs use an event-driven paradigm, the language is not limited to event-driven applications. As an example, tokens generated from the parsing of a text file can be treated as events and analyzed by programs written in this language.

While particular embodiments of the present invention have been shown and described, modifications may be made by one skilled in the art without altering the invention. It is therefore intended in the appended claims to cover such changes and modifications which follow in the true spirit and scope of the invention.

I claim:

1. A method of adding new software features to an application without modifying existing code of the application, the method comprising:

receiving a model of the application, the model comprising domain variables and interface events, where:

each interface event defines a set of event types, each event type comprising a unique name and a data structure, the data structure having qualifying fields used for qualification, and the domain variables are of a Boolean type or a domain data type that includes predicate functions, Boolean variables, and a combination function, receiving features chosen for a feature package, the features of the feature package comprising an anchor feature and a supplementary feature, where each of the anchor and supplementary features refers to the model and comprises program units defined by a nonprocedural language programming language construct, and where each program unit refers to the model and comprises:

a condition part, the condition part comprising a condition statement and event statement; and a body part executed when the condition part is true;

identifying interactions between the program units of the anchor feature;

identifying interactions between the program units of the supplementary feature; where identifying interactions between program units comprises identifying an interaction condition between a first program unit and a second program unit;

outputting the interactions between the program units of the anchor feature and the interactions between the program units of the supplementary feature;

enabling resolution of the interactions between the program units of the anchor feature and the interactions between the program units of the supplementary feature without modifying existing code of the program units;

identifying interactions between the features of the feature package;

outputting the identified interactions between the features of the feature package; and enabling resolution of the interactions between the features of the feature package without modifying existing code of the features.

2. The method of claim 1, further comprising permitting at most only one program unit to have a condition part that is true at one time unless a plurality of program units that have true condition parts also have a precedence relationship defined by a programmer.

3. The method of claim 1, further comprising permitting only atomic execution of the body part in which events sent from a current body part are kept in an event queue and only after the current body part is exited is the condition part of another program unit evaluated using latest values of the domain variables.

4. The method of claim 1, further comprising automatically checking that:

the condition part of at least one program unit of the anchor feature is true with respect to initial values of the domain variables;

each supplementary feature refers to at least one anchor feature and at least one program unit of each supplementary feature interacts with one program unit of every anchor feature to which the supplementary feature refers; and the feature package comprises a list of features in the feature package, all features of the feature package referencing at least one anchor feature in the feature package.

5. The method of claim 1, further comprising specifying precedence relationships between program units, where the precedence relationships are specified within a precedence list or by a collection of program units.

6. The method of claim 1, further comprising checking circular inclusion when two features in the feature package transitively include one another or when two feature packages transitively include one another.

7. The method of claim 1, where enabling resolution of the interactions among features of the feature package without modifying existing code of the features comprises arranging interacting features and interacting program units in a precedence list.

8. The method of claim 1, further comprising extending a definition of an existing domain variable or interface event in an existing model by adding new elements to the existing definition of the existing domain variable or extending an existing range of values of the domain variable or qualification.

9. The method of claim 8, further comprising extending the definition without eliminating existing elements or reducing the existing range of values.

10. The method of claim 8, further comprising extending the existing model to include all domain variables and interface events defined in the existing model to form an extended model.

11. The method of claim 10, further comprising reusing features of the existing model in a feature package for the extended model.

12. The method of claim 11, further comprising including the reused features in a feature list of a feature package for the extended model.

13. The method of claim 12, further comprising preserving precedence relationships among program units of the reused feature.

14. The method of claim 13, further comprising qualifying reuse of the reused features by modifying condition parts of the program units of the reused features such that lists of events in event statements of the program units include events specified in the qualification.

15. The method of claim 13, wherein the extended model includes new variables, the method further comprising qualifying reuse of the reused features by setting the condition statements of the features of the existing model to have no dependence on the new variables when reviewing and executing the features of the existing model to see if the condition statement are true.

16. The method of claim 1, where each anchor feature in the feature package is independently developed without requiring changes to other anchor features in the feature package.

17. The method of claim 1, where each supplementary feature in the feature package is independently developed without requiring changes to other supplementary features in the feature package.

18. The method of claim 1, further comprising checking for interaction among program units in the same feature and checking whether any program unit in a first feature interacts with a program unit in a second feature when both the first and second features are put together in the feature package.

19. The method of claim 18, further comprising determining interaction between a set of program units by determining whether the set of program units wait for the same event and a conjunction of qualification of the set of program units with respect to that same event is satisfiable, determining that a conjunction of condition statements of the set of program units is satisfiable, and determining that the set of program units do not have a precedence relationship.

20. The method of claim 19, further comprising determining that the conjunction of condition statements of the set of program units is satisfiable by deriving a disjunctive normal form of a combined condition statement of the set of program units, and determining that each term in the disjunctive normal form of the combined condition statement is satisfiable.

21. The method of claim 20, further comprising determining that the conjunction of each term in the disjunctive normal form of the combined condition statement is satisfiable by grouping literals belonging to the same domain data type together and evaluating each group of literals by using the combination function of the literals in the group of literals or, when the literals are Boolean variables, looking for contradiction.

22. The method of claim 19, further comprising checking whether the domain variables are independent of one another, where a domain variable is independent of another domain variable if the domain variable is not a function of the other domain variable.

23. The method of claim 1, further comprising determining that a program unit of a feature in the feature package is ready for execution when a condition part of the program unit becomes true unless a plurality of program units that have true condition parts also have a precedence relationship, where the precedence relationship is defined in a precedence list included in the feature package.

24. The method of claim 23, further comprising converting all precedence lists to program units such that the feature package contains only program units.

25. The method of claim 1, further comprising establishing that both the condition statement and event list of more than one program unit in the feature package are not true at the same time unless they have a precedence relationship.

26. The method of claim 1, further comprising maintaining a common state register of truth values of all distinct literals used in condition statements of the program units in the feature package and updating the truth values at a desired time during execution of the feature package.

27. The method of claim 1, further comprising maintaining an event qualification register of event qualifications of each event in an event queue of the program units in the feature package and updating the event qualifications at a desired time during execution of the feature package.

28. The method of claim 1, further comprising generating a first set of static data based on the condition statements of the program units in the feature package, storing the first set of static data in a first register, generating a second set of static data based on the event statements of the program units in the feature package from detection of interaction among the features, and for both the first and second sets of static data: constructing a unit condition register or an event qualification register that records values of variables that satisfy each term in a disjunctive normal form of the condition or event, constructing a mask register to indicate a position of the variables used in the term, and determining whether the common state register satisfies the unit condition register or event qualification register by comparing the unit condition register or event qualification register to the corresponding mask register.

29. The method of claim 1, further comprising operating on an initial state when a run time system is first created, an active state when the run time system is executing a program unit of the feature package, and an idle state when run time system is waiting for an event to make a condition part of some program unit of the feature package true, invoking the run time system when the run time system receives an event or when the program unit of the feature package that is under execution returns.

30. The method of claim 1, further comprising:
initializing a run time system;
after initialization of the run time system, executing one of the program units using the run time system;
after completion of execution of the program unit, checking for an arrival of events, updating domain variables that have been changed as a result of the execution of the program unit, and searching for whether the condition part of any of the program units has become true;
if the condition part of a particular program unit has become true, executing the particular program unit to completion; and
if the condition part of the particular program unit has not become true, waiting for another event until an exit command from a program unit has been executed,
wherein the condition part of at most one program unit is true at one time unless a plurality of program units that have true condition parts also have a precedence relationship.

31. The method of claim 1, further comprising determining if contradictory precedence relationships exist among the program units and resolving the contradictory precedence relationships.

32. The method of claim 1, further comprising:
allocating space and initializing the domain variables and local variables defined for the feature package, features and program units in the feature package;
determining a value of a common state register that contains truth values of all distinct literals used in condition statements of the program units belonging to the feature package;
determining a set of program units in a current list, where the current list identifies a list of program units for which the condition statement of the program units is true;
setting a state of a run time system as active: if a program unit exists in the current list that is not waiting for any events and executing the program unit that is not waiting for any events or if an event queue is not empty and an event exists in the event queue that matches one of the program units in the current list, and otherwise setting the state of the run time system as idle.

33. The method of claim 32, further comprising invoking the run time system when the run time system receives an event or when the program unit being executed returns.

34. The method of claim 33, further comprising permitting only atomic execution of any program unit such that the run time system does not stop during execution of a particular program unit and switch to execute a different program unit.

35. The method of claim 34, further comprising processing only one event at a time and determining a priority scheme of events to be processed independently.

36. The method of claim 35, further comprising linking different values of the common state register to different program units via static analyses thereby enabling the run time system to learn and remember a current list of program units for a specific value of the common state register at run time such that the run time system does not determine the current list at a subsequent time the run time system is active.

37. The method of claim 1, further comprising dividing a domain of discourse defined by the domain variables and associated predicate functions specified in the model into finite number of partitions using the condition statements of the program units of the feature package, a number of partitions in a feature package being at most a number of program units in the feature package.

38. The method of claim 1, where the anchor feature is an executable anchor feature, where the feature package is an executable feature package, and wherein the executable anchor feature and the executable feature package are finite state automata.

39. The method of claim 1, further comprising including an exception condition in at least one program unit of a particular feature and inserting the at least program unit at a bottom of a precedence list of the particular feature or including a new feature containing the exception condition and inserting the new feature at a bottom of a precedence list of a feature package containing the new feature.

40. The method of claim 1, where identifying the interaction condition between the first and second program units comprises:
 determining whether the first and second program units have a precedence relationship; and
 if the first and second program units do not have a precedence relationship:
  determining whether the first and second program units wait for a common event, the first program unit and the second program unit each comprising a qualification and a condition statement associated with the common event;
  for each common event:
   determining whether a conjunction of the qualifications each of the first and second program units is satisfiable; and
   determining whether a conjunction of the condition statements of each of the first and second program units is satisfiable;
  identifying the interaction condition as comprising the satisfiable conjunctions determined for each common event; and
  reporting outputting the at least one interaction condition to the programmer.

41. The method of claim 40, where each of the condition statements of the first and second program units and each of the qualifications of the first and second program units is a simplified predicate formula, and where determining whether a conjunction of two simplified predicate formulas, M and N, is satisfiable comprises:
 deriving a disjunctive normal form D(M) of M;
 deriving a disjunctive normal form D(N) of N;
 for each term in D(M), determining whether the conjunction E(M, N) (i) between each term in D(M) and each term in D(N) is satisfiable, where i represents the $i^{th}$ conjunction; and
 for each satisfiable conjunction E(M, N) (i), outputting the satisfiable conjunction E(M, N)(i).

42. The method of claim 41, where determining whether the conjunction E(M,N) (i) between each term in D(M) and each term in D(N) is satisfiable comprises:
 for each E(M, N)(i), group literals belonging to a same domain data type together to form a group of literals;
 evaluating each group of literals by:
  using respective combination functions of the groups of literals; or
  identifying contradiction where the group of literals comprises Boolean variables;
 identifying the conjunction E(M,N) (i) as satisfiable if any group of the group of literals evaluates to a FALSE value in response to evaluating.

43. The method of claim 42, further comprising determining whether values in a first register satisfies a BOOLEAN formula M, in which the first register contains bits that each represent a value of a distinct BOOLEAN variable, a second register has the same dimension as the first register, each bit of the first and second registers in the same position represent the same variable, the second register records values of variables that will satisfy the BOOLEAN formula M, and a third register represents variables used in the formula M with TRUE and FALSE otherwise, through Algorithm 4 and applying Algorithm 4 to determine whether a common state register (CSR) satisfies a unit condition register (UCR) and an event state register (ESR) satisfies an event qualification, wherein Algorithm 4 comprises:
 performing a bit by bit logical AND operation between the first and third registers, and recording the result into a temporary vector of the same dimension such that at the end of the bit by bit logical AND operation, the temporary vector has a value of FALSE on every variable not used in the formula and the same value as in the first register on every variable used in the formula;
 performing a bit by bit logical EXCLUSIVE OR between the temporary vector and the second register; and
 establishing that the first register satisfies the BOOLEAN formula M only if the temporary vector and the second register match exactly.

44. The method of claim 1, providing a run-time system for managing execution of the feature package including features and program units of the feature package, where providing a run-time system comprises:
 allocating space and initializing the domain variables and local variables defined for the feature package, and for the features and program units of the feature package;
 initialize a current state register, the current state register identifying a run-time system state;
 determining a current list, where the current list identifies a list of program units for which the condition statement of the program units is true;
 determine whether any of the program units in the current list are waiting for an event;
 if a program unit in the current list is not waiting for an event:
  set the run-time system state to an active state; and
  execute the program unit;
 if the program units in the current list are each waiting for an event:
  determine if an event queue includes an event that satisfies an event statement of a program unit in the current list;
  if the event queue includes an event that satisfies the event statement of a program unit in the current list:
   set the run-time system state to an active state; and
   execute the program unit;
  if the event queue does not include an event that satisfies the event statement of a program unit in the current list:
   set the run-time system state to an idle state.

45. The method of claim 44, further comprising invoking the run time system comprising:
 receiving an event;
 assigning the received event to the event queue if the run-time system state is set to the active state;
 if the run-time system state is not set to the active state:
  determining whether the received event satisfies an event statement of a program unit in the current list;
  if the received event satisfies an event statement of a program unit in the current list, setting the run-time system state to the active state; and executing the program unit in the current list for which the event statement of the program unit is satisfied by the received event;

otherwise, assigning the received event to the event queue.

46. The method of claim 44, further comprising invoking the run time system comprising:

determining whether, upon execution of a program unit, any domain variables of the program unit have been updated; and if any domain variables of the executed program unit have been updated:

updating the current state register;

updating the current list;

terminating the run-time system if the current list is empty; and if the current list is not empty, or if no domain variables of the executed program have been updated:

setting the run-time system state to the idle state if the event queue is empty, otherwise:

determining if the event queue includes an event that satisfies an event statement of a program unit in the current list;

setting the run-time system state to the idle state if the event queue does not include an event that satisfies an event statement of a program unit in the current list; and if the event queue does include an event that satisfies an event statement of a program unit in the current list, setting the run-time system state to the active state and executing the program unit.

47. The method of claim 1, wherein the condition statement is a Boolean formula of Boolean domain variables and predicates of other types of domain variables and the interface event includes a Boolean formula of the qualifying fields of the interface event and the body part includes operating on the domain variables and sending events.

48. The method of claim 1, wherein the feature package further comprises a list of program units contained within the feature package.

49. The method of claim 1, wherein the feature package further comprises precedence lists of features and program units contained within the feature package.

50. The method of claim 1, further comprising reusing features and feature packages in an extended model containing new domain variables by modifying condition parts of the program units in the features and feature packages to include conditions containing the new domain variables.

51. The method of claim 1, further comprising determining whether the condition statement of a particular program unit is satisfied by a bit by bit comparison between two registers.

52. The method of claim 1, further comprising analyzing the feature package as a finite state automata, where the feature package is an executable program.

53. A method for developing an executable application comprising a well-formed feature package, the method comprising:

obtaining a model of the application; and obtaining the well-formed feature package comprising an anchor feature and a supplementary feature, where obtaining the well-formed feature package comprises:

obtaining the anchor feature, the anchor feature comprising a first and a second program unit defined by a nonprocedural programming language construct, where the anchor feature is developed based on the model, and where each program unit comprises:

a condition part, the condition part comprising a condition statement and an event statement; and a body part executed when the condition part is true;

determining whether the first and second program units have a precedence relationship; and if the first and second program units do not have a precedence relationship:

determining whether the first and second program units wait for a common event, the first program unit and the second program unit each comprising a qualification and a condition statement associated with the common event;

for each common event:

determining whether a conjunction of the qualifications each of the first and second program units is satisfiable; and determining whether a conjunction of the condition statements of each of the first and second program units is satisfiable; and identifying an interaction condition between the first and second program units as comprising the satisfiable conjunctions determined for each common event; and outputting the interaction condition identified between the first and second program units;

obtaining the supplementary feature, the supplementary feature comprising a third and a fourth program unit defined by a nonprocedural programming language construct, where the supplementary feature refers to the anchor feature and at least one program unit of the supplementary feature interacts with at least one program unit of the anchor feature;

identifying an interaction condition between the third and fourth program units; and outputting the interaction condition identified between the third and fourth program units.

* * * * *